(12) United States Patent
Karaki et al.

(10) Patent No.: US 9,540,584 B2
(45) Date of Patent: Jan. 10, 2017

(54) ULTRAVIOLET CURABLE RESIN COMPOSITION, SLIDING MEMBER, AND METHOD FOR PRODUCING SLIDING MEMBER

(71) Applicant: MINEBEA CO., LTD., Kitasaku-gun, Nagano (JP)

(72) Inventors: Tadahiko Karaki, Tomi (JP); Koichiro Sagiyama, Chiba (JP); Hirotaka Toyama, Kitasaku-gun (JP); Kentaro Ishikawa, Kitasaku-gun (JP)

(73) Assignee: MINEBEA CO., LTD., Nagano (JP)

( * ) Notice: Subject to any disclaimer, the term of this patent is extended or adjusted under 35 U.S.C. 154(b) by 127 days.

(21) Appl. No.: 14/669,950

(22) Filed: Mar. 26, 2015

(65) Prior Publication Data
US 2015/0275125 A1 Oct. 1, 2015

(30) Foreign Application Priority Data

Mar. 31, 2014 (JP) .................................. 2014-073827
Mar. 16, 2015 (JP) .................................. 2015-051715

(51) Int. Cl.
*C10M 147/02* (2006.01)
*F16C 33/20* (2006.01)
(Continued)

(52) U.S. Cl.
CPC .............. *C10M 147/02* (2013.01); *C08F 2/48* (2013.01); *C08F 220/34* (2013.01);
(Continued)

(58) Field of Classification Search
CPC ....... F16C 33/201; F16C 33/208; F16C 17/02; F16C 23/045; C08F 2/48; C08F 220/34; C08L 2312/00; C09D 133/14; C10M 107/00; C10M 107/40; C10M 145/16; C10M 147/02; C10M 2209/0845; C10M 2213/0623; C10M 2217/0245; C10N 2220/082; C10N 2230/06
(Continued)

(56) References Cited

U.S. PATENT DOCUMENTS 5,576,381 A * 11/1996 Bladel .................. C03C 25/305
                                                                524/544
6,180,574 B1    1/2001 Ryan et al.
(Continued)

FOREIGN PATENT DOCUMENTS

DE    603 18 410 T2    12/2008
EP     2 842 970 A1     3/2015
(Continued)

OTHER PUBLICATIONS

Aug. 5, 2015 Search Report issued in German Patent Application No. 10 2015 004 130.4.

*Primary Examiner* — James Goloboy
(74) *Attorney, Agent, or Firm* — Oliff PLC

(57) ABSTRACT

There is provided an ultraviolet curable resin composition for a self-lubricating liner. The composition includes a first (meth)acrylate compound having an isocyanuric acid ring represented by the following formula (1); a second (meth) acrylate compound different from the first (meth)acrylate compound; a first polytetrafluoroethylene resin with an average particle size in the range of 75 μm to 180 μm; and a second polytetrafluoroethylene resin with an average particle size in the range of 1 μm to 15 μm, wherein the total amount of the first polytetrafluoroethylene resin and the second polytetrafluoroethylene resin is in the range of 30% by weight to 50% by weight with respect to the entire amount of the ultraviolet curable resin composition; and the
(Continued)

second polytetrafluoroethylene resin is contained in an amount of 20% by weight to 75% by weight with respect to the total amount of the first and second polytetrafluoroethylene resins.

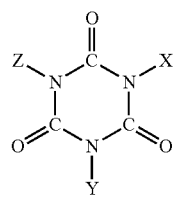

(1)

18 Claims, 4 Drawing Sheets

(51) Int. Cl.
*C10M 133/42* (2006.01)
*C10M 145/16* (2006.01)
*C08F 2/48* (2006.01)
*C08F 220/34* (2006.01)
*C09D 133/14* (2006.01)
*C10M 107/00* (2006.01)
*C10M 107/40* (2006.01)
*F16C 17/02* (2006.01)
*F16C 23/04* (2006.01)

(52) U.S. Cl.
CPC ......... *C09D 133/14* (2013.01); *C10M 107/00* (2013.01); *C10M 107/40* (2013.01); *C10M 145/16* (2013.01); *F16C 33/201* (2013.01); *F16C 33/208* (2013.01); *C08L 2312/00* (2013.01); *C10M 2209/0845* (2013.01); *C10M 2213/0623* (2013.01); *C10M 2217/0245* (2013.01); *C10N 2220/082* (2013.01); *C10N 2230/06* (2013.01); *F16C 17/02* (2013.01); *F16C 23/045* (2013.01)

(58) Field of Classification Search
USPC ................................ 508/100, 106, 181, 257
See application file for complete search history.

(56) References Cited

U.S. PATENT DOCUMENTS

| | | |
|---|---|---|
| 8,690,438 B2 | 4/2014 | Karaki et al. |
| 2003/0166749 A1 | 9/2003 | Eckstein et al. |
| 2007/0223850 A1 | 9/2007 | Lopes et al. |
| 2011/0262059 A1 | 10/2011 | Karaki et al. |
| 2014/0169713 A1 | 6/2014 | Karaki et al. |
| 2015/0051123 A1* | 2/2015 | Karaki ............... C08F 114/26 508/106 |

FOREIGN PATENT DOCUMENTS

| | | | |
|---|---|---|---|
| JP | 2007-255712 A | | 10/2007 |
| JP | 2010100736 A | * | 5/2010 |
| JP | 2011-247408 A | | 12/2011 |
| WO | 2013/161402 A1 | | 10/2013 |

* cited by examiner

ULTRAVIOLET CURABLE RESIN COMPOSITION, SLIDING MEMBER, AND METHOD FOR PRODUCING SLIDING MEMBER

CROSS REFERENCE TO RELATED APPLICATION

The present application claims priorities from Japanese Patent Application No. 2014-073827 filed on Mar. 31, 2014 and Japanese Patent Application No. 2015-051715 filed on Mar. 16, 2015, the disclosures of which are incorporated herein by reference in its entirety.

BACKGROUND OF THE INVENTION

Field of the Invention:

The present invention relates to an ultraviolet curable resin composition for forming a self-lubricating liner of a sliding member such as an unlubricated sliding bearing and a reamer bolt, a sliding member provided with the self-lubricating liner, and a manufacturing method for producing the sliding member.

Description of the Related Art:

A sliding bearing in which a shaft of rotary motion or translational motion is held by a sliding surface has been widely used. In particular, an unlubricated sliding bearing using no lubricating oil for a sliding surface has been used for applications requiring low friction coefficient, high durability, high load capacity, high heat resistance, high oil resistance, and the like, such as vessel or ship application and aircraft application.

As the unlubricated sliding bearing, Japanese Patent Application Laid-open No. 2007-255712 discloses a spherical bearing for high-load application including an outer race member having a concave first bearing surface and an inner race member having a convex second bearing surface slidably movable relative to the first bearing surface. In the spherical bearing, one of the outer race member and the inner race member is made of titanium alloy which has a bearing surface made of titanium nitride formed on the titanium alloy surface by a physical vapor deposition method (PVD). The bearing surface of the other member includes a self-lubricating liner made from resin. The self-lubricating liner is composed of a fabric including fibers of polytetrafluoroethylene (PTFE) and polyaramid. The fabric is saturated with a phenol resin composition.

U.S. Pat. No. 6,180,574 discloses a self-lubricating coating composed of a thermosetting acrylic composition in which dipentaerythritol pentaacrylate is contained in an amount of 20% by weight or more and a solid lubricant such as polytetrafluoroethylene is contained in an amount of 10% by weight or more with respect to the total amount of the thermosetting acrylic composition. 20% by weight or more of triethylene glycol dimethacrylate and 1% by weight or less of aramid pulp may be added to the self-lubricating coating. U.S. Pat. No. 6,180,574 also discloses a sleeve bearing in which the self-lubricating coating is applied, as a liner, on the inner circumferential surface of an outer race.

Japanese Patent Application Laid-open No. 2011-247408 filed by the applicant of the present application discloses a sliding bearing suitable for the aircraft application and the like. The sliding bearing includes a self-lubricating liner formed on a sliding surface of the sliding bearing, and the self-lubricating liner is composed of a self-lubricating resin composition obtained by mixing 60% by weight to 80% by weight of polyether ketone resin, 10% by weight to 30% by weight of PTFE, 5% by weight to 15% by weight of carbon fiber, and 15% by weight or less of aramid fiber. The total amount of the carbon fiber and the aramid fiber is 10% by weight to 25% by weight in the self-lubricating resin composition. A metal surface on which the self-lubricating liner is formed has a surface roughness Ra (average centerline roughness) of 4.0 µm or more and an Rmax (maximum height) of 30.0 µm or more.

The unlubricated sliding bearings disclosed in Japanese Patent Application Laid-open No. 2007-255712, U.S. Pat. No. 6,180,574 and Japanese Patent Application Laid-open No. 2011-247408 are used by being incorporated into the aircraft and the like, and thus they are required to have low friction coefficient, high load capacity, heat resistance, oil resistance, and the like. Further, there is a demand from airframe manufacturers such that a fitting adjustment can be performed by adjusting the size of a sliding surface of a sliding bearing through grinding or cutting in an assembling step of the sliding bearing such as the sleeve bearing, instead of performing the size adjustment of a shaft.

However, in the case of the fibrous lubricating liner described in Japanese Patent Application Laid-open No. 2007-255712, it is not possible to perform the size adjustment through the grinding or the cutting because, if it is subjected to such a posterior processing, the fibers of the lubricating liner will be cut and the lubricating liner will not function as a liner any longer.

The self-lubricating coating described in U.S. Pat. No. 6,180,574 is based on thermosetting acrylic resin, and thus it takes time to cure. This brings such a problem that the productivity thereof is low. Further, if an attempt is made to handle the thermosetting acrylic resin in an uncured condition in order to save time, the uncured resin flows and the shape of self-lubricating coating cannot be maintained. Thus, it is difficult to handle the self-lubricating coating based on the thermosetting acrylic resin.

The self-lubricating liner described in Japanese Patent Application Laid-open No. 2011-247408 is based on the polyether ketone resin which is thermoplastic resin, and thus the self-lubricating liner can be produced by an injection molding method achieving high productivity. However, in order to improve the adhesion of the liner to the inner circumferential surface of the outer race, it is required that a shot blasting process for roughening the surface roughness of the inner circumferential surface of the outer race be performed beforehand. Further, in a case that PTFE is blended as a solid lubricant with the thermoplastic resin such as the polyether ketone resin, PTFE is required to be blended in an amount of less than 30% by weight with respect to the total amount of the thermoplastic resin. The reason thereof is as follows. During the kneading of resin and the injection molding, PTFE generates decomposition gas because it is heated to its melting point or more by being exposed to high temperature and high pressure. From the viewpoint of safety, it is required that such decomposition gas be prevented from being generated. Accordingly, the addition amount of PTFE should be limited. On the other hand, in order to improve the lubricating property of the liner, it is desirable that the addition amount of PTFE be increased.

Under the above circumstances, there is a demand for a resin composition for a self-lubricating liner which can ensure a sufficient addition amount of PTFE, can be handled easily during manufacturing steps, and requires no process for roughening the base surface.

SUMMARY OF THE INVENTION

The present invention has been conceived to solve the foregoing problems. An object of the present invention is to provide a resin composition for forming a self-lubricating liner which has low friction coefficient, high durability, high load capacity, high heat resistance and high oil resistance, as well as which is capable to perform a size adjustment through grinding or cutting after the curing of resin and which requires no process for roughening a base surface, and also to provide a resin composition which can be handled easily in manufacturing steps. Another object of the present invention is to provide a sliding member with the self-lubricating liner composed of the resin composition.

According to a first aspect related to the present invention, there is provided an ultraviolet curable resin composition for a self-lubricating liner, the composition including:

a first (meth)acrylate compound having an isocyanuric acid ring represented by the following formula (1):

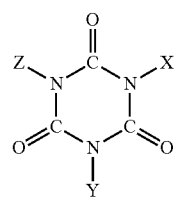

(1)

(wherein X is a group which contains an acryloyl group and is composed only of C, H, and O, and Y and Z are groups each composed only of C, H, and O);

a second (meth)acrylate compound different from the first (meth)acrylate compound;

a first polytetrafluoroethylene resin with an average particle size in the range of 75 μm to 180 μm; and a second polytetrafluoroethylene resin with an average particle size in the range of 1 μm to 15 μm, wherein a total amount of the first polytetrafluoroethylene resin and the second polytetrafluoroethylene resin is in the range of 30% by weight to 50% by weight with respect to an entire amount of the ultraviolet curable resin composition; and the second polytetrafluoroethylene resin is contained in an amount of 20% by weight to 75% by weight with respect to the total amount of the first and second polytetrafluoroethylene resins.

In the ultraviolet curable resin composition related to the first aspect, the first (meth)acrylate compound may be contained in an amount of 15% by weight to 35% by weight with respect to the entire amount of the ultraviolet curable resin composition; and a total amount of the first (meth)acrylate compound and the second (meth)acrylate compound may be in the range of 35% by weight to 65% by weight with respect to the entire amount of the ultraviolet curable resin composition. A melting point of the first polytetrafluoroethylene resin may be higher than a melting point of the second polytetrafluoroethylene resin.

In the ultraviolet curable resin composition related to the first aspect, it is preferred that the first (meth)acrylate compound having the isocyanuric acid ring represented by the formula (1) be one of di-(2-(meth)acryloxyethyl)isocyanurate, tris-(2-(meth)acryloxyethyl)isocyanurate, and ε-caprolactone modified tris-(2-acryloxyethyl)isocyanurate, or a mixture of the di-(2-(meth)acryloxyethyl)isocyanurate and the tris-(2-(meth)acryloxyethyl)isocyanurate.

In the ultraviolet curable resin composition related to the first aspect, the second (meth)acrylate compound may include at least one meth(acrylate) compound selected from the group consisting of: hydroxyethyl(meth)acrylate, hydroxypropyl (meth)acrylate and isobornyl (meth)acrylate; and the at least one meth(acrylate) compound may be contained in an amount of 5% by weight to 20% by weight with respect to the entire amount of the ultraviolet curable resin composition. The second (meth)acrylate compound may include at least one meth(acrylate) compound selected from the group consisting of: pentaerythritol triacrylate, pentaerythritol tetraacrylate, dipentaerythritol penta(meth)acrylate, dipentaerythritol hexa(meth)acrylate, and dipentaerythritol polyacrylate; and the at least one meth(acrylate) compound may be contained in an amount of 8% by weight or less with respect to the entire amount of the ultraviolet curable resin composition. The second (meth)acrylate compound may include bisphenol A-type epoxy modified acrylate; and the bisphenol A-type epoxy modified acrylate may be contained in an amount of 10% by weight or less with respect to the entire amount of the ultraviolet curable resin composition. The second (meth)acrylate compound may include urethane acrylate; and the urethane acrylate may be contained in an amount of 2% by weight or less with respect to the entire amount of the ultraviolet curable resin composition. The second (meth)acrylate compound may include at least one meth(acrylate) compound selected from the group consisting of: ethylene glycol di(meth)acrylate, propylene glycol di(meth)acrylate, butylene glycol di(meth)acrylate, hexanediol di(meth)acrylate, tetraethylene glycol di(meth)acrylate, triethylene glycol di(meth)acrylate, and tripropylene glycol di(meth)acrylate; and the at least one meth(acrylate) compound may be contained in an amount of 2% by weight or less with respect to the entire amount of the ultraviolet curable resin composition.

In the ultraviolet curable resin composition related to the first aspect, the first (meth)acrylate compound may be a mixture of di-(2-acryloxyethyl)isocyanurate and tris-(2-acryloxyethyl)isocyanurate; and the second (meth)acrylate compound may be a mixture of bisphenol A-type epoxy modified acrylate, dipentaerythritol hexa(meth)acrylate, isobornyl (meth)acrylate, hydroxyethyl (meth)acrylate, and ethylene glycol di(meth)acrylate.

In the ultraviolet curable resin composition related to the first aspect, the first polytetrafluoroethylene resin and/or the second polytetrafluoroethylene resin may be polytetrafluoroethylene resin surface-treated with epoxy modified acrylate.

The ultraviolet curable resin composition related to the present invention may further contain a thermosetting agent.

According to a second aspect related to the present invention, there is provided a sliding member including a self-lubricating liner which is formed on a sliding surface of the sliding member and is made of the ultraviolet curable resin composition related to the present invention. The sliding member may be a sliding bearing or a spherical bearing. The sliding member may be a bolt including a head portion, a shaft portion, a thread portion, and the self-lubricating liner formed on an outer circumferential surface of the shaft portion.

According to a third aspect related to the present invention, there is provided a manufacturing method for producing a sliding member, including:

applying an ultraviolet curable resin composition on a sliding surface of the sliding member; and curing the ultraviolet curable resin composition by irradiation with ultraviolet rays to form a self-lubricating liner,
wherein the ultraviolet curable resin composition includes:
a first (meth)acrylate compound having an isocyanuric acid ring represented by the following formula (1):

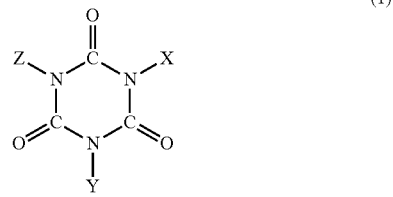

(1)

(wherein X is a group which contains an acryloyl group and is composed only of C, H, and O, and Y and Z are groups each composed only of C, H, and O);
a second (meth)acrylate compound different from the first (meth)acrylate compound;
a first polytetrafluoroethylene resin with an average particle size in the range of 75 μm to 180 μm; and
a second polytetrafluoroethylene resin with an average particle size in the range of 1 μm to 15 μm,
wherein a total amount of the first polytetrafluoroethylene resin and the second polytetrafluoroethylene resin is in the range of 30% by weight to 50% by weight with respect to an entire amount of the ultraviolet curable resin composition; and
the second polytetrafluoroethylene resin is contained in an amount of 20% by weight to 75% by weight with respect to the total amount of the first and second polytetrafluoroethylene resins.

In the manufacturing method related to the third aspect, the first (meth)acrylate compound may be contained in an amount of 15% by weight to 35% by weight with respect to the entire amount of the ultraviolet curable resin composition; and a total amount of the first (meth)acrylate compound and the second (meth)acrylate compound may be in the range of 35% by weight to 65% by weight with respect to the entire amount of the ultraviolet curable resin composition. The manufacturing method for producing the sliding member can further include a step of performing cutting or grinding of the self-lubricating liner to have a desired size.

In the manufacturing method for producing the sliding member, the ultraviolet curable resin composition may further contain a thermosetting agent; the sliding member may be a spherical bearing including an outer race member (outer ring member) which has a concave first bearing surface and an inner race member (inner ring member) which has a convex second bearing surface slidably movable on the first bearing surface; and the self-lubricating liner may be formed by: applying the ultraviolet curable resin composition on the first bearing surface or the second bearing surface as the sliding surface; curing the ultraviolet curable resin composition applied on the first bearing surface or the second bearing surface until semi-cured state by irradiation with ultraviolet rays; inserting the inner race member into the outer race member after the ultraviolet curable resin composition is semi-cured; pressing the outer race member to cause plastic deformation so as to make the outer race member follow the convex second bearing surface of the inner race member; and curing the ultraviolet curable resin composition completely by heat after the plastic deformation.

DESCRIPTION OF THE PREFERRED EMBODIMENTS

Figure 1A:
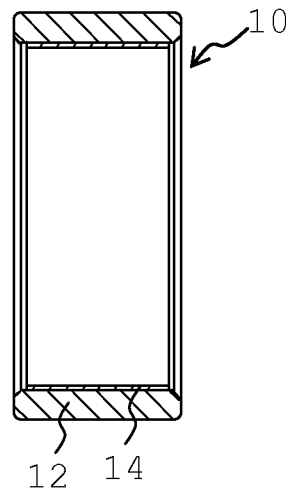
FIG. 1A is a longitudinal sectional view of a sleeve bearing according to an embodiment related to the present invention cut along an axial direction of the sleeve bearing.
Figure 1B:
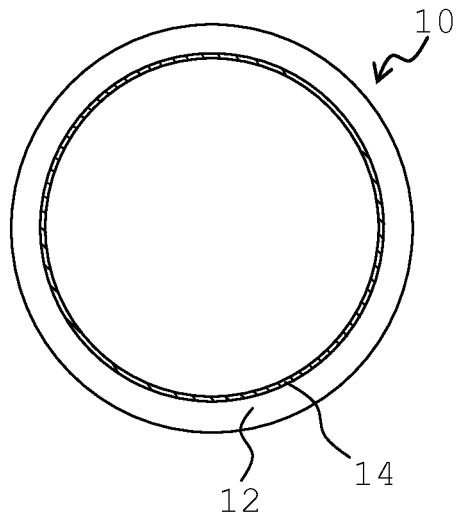
FIG. 1B is a lateral sectional view of the sleeve bearing cut along a direction perpendicular to the axis.

In the following, an explanation will be made about an ultraviolet curable resin composition related to the present invention and a sliding member with a self-lubricating liner made from the ultraviolet curable resin composition.
<Sliding Member>
At first, an exemplary sliding member including the self-lubricating liner made from the ultraviolet curable resin composition related to the present invention will be explained while referring to FIGS. 1A and 1B. A sleeve bearing 10 shown in FIGS. 1A and 1B includes a cylindrical outer race member 12 which is made of metal such as bearing steel, stainless steel, duralumin material, and titanium alloy and a self-lubricating liner layer 14 which is formed on the inner circumferential surface of the outer race member 12. The self-lubricating liner layer 14 is formed by applying the ultraviolet curable resin composition related to the present invention which will be described below on the inner circumferential surface of the outer race member 12 and then curing the applied ultraviolet curable resin composition. The size adjustment of self-lubricating liner can be easily performed by grinding or cutting, and thus the self-lubricating liner may be referred to as a "machinable liner" (processable liner) as appropriate. The sliding member includes not only a sleeve bearing used for rotary motion or translational (linear) motion but also various sliding members such as a spherical bearing and a reamer bolt which will be described later. These sliding members are also included in an object of the present invention.
<Ultraviolet Curable Resin Composition>
The ultraviolet curable resin composition contains (meth) acrylate (first (meth)acrylate compound) having an isocyanuric acid ring represented by the following formula (1) as a component mainly composing the resin.

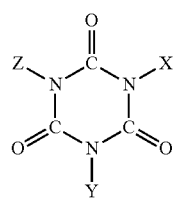

(1)

In the formula (1), X is a group which contains an acryloyl group and is composed only of C, H, and O. Y and Z are groups each composed only of C, H, and O. Y and Z may or may not contain the acryloyl group. It is preferred that X be an acryloxyethyl group or an acryloxyethyl group modified by ε-caprolactone. It is preferred that Y and Z be the same group as X. In the present invention, a term "(meth)acrylate" means acrylate or methacrylate.

The (meth)acrylate having the isocyanuric acid ring represented by the formula (1) (hereinafter simply referred to as the (meth)acrylate having the isocyanuric acid ring) has satisfactory heat resistance in addition to the ultraviolet curing property, and thus it is preferably used for a self-lubricating liner of sliding members and the like. In particular, the sliding member incorporated into the aircraft is required to have the heat resistance of 163 degrees Celsius or more, and even in such a case, the (meth)acrylate having the isocyanuric acid ring is preferably used.

It is preferred that the (meth)acrylate having the isocyanuric acid ring be capable of being applied on a sliding surface as a composition and be capable of forming a self-lubricating liner which is less likely to wear after curing. From this viewpoint, as the (meth)acrylate having the isocyanuric acid ring, bis(acryloyloxyethyl)hydroxyethyl isocyanurate, di-(2-(meth)acryloxyethyl)isocyanurate, tris-(2-(meth)acryloxyethyl)isocyanurate, ε-caprolactone modified tris-(2-acryloxyethyl)isocyanurate, and the like are preferably used. The above examples of the (meth)acrylate having the isocyanuric acid ring may be used individually or combining two or more kinds Especially, any of di-(2-(meth)acryloxyethyl)isocyanurate, tris-(2-(meth)acryloxyethyl)isocyanurate, and ε-caprolactone modified tris-(2-acryloxyethyl)isocyanurate is preferably used, or a mixture of di-(2-(meth)acryloxyethyl)isocyanurate and tris-(2-(meth)acryloxyethyl)isocyanurate is preferably used.

It is preferred that the (meth)acrylate having the isocyanuric acid ring be contained in an amount of 15% by weight to 35% by weight with respect to the entire amount of the resin composition related to the present invention. In a case that the content of the (meth)acrylate having the isocyanuric acid ring is less than 15% by weight, the fluidity of resin is insufficient. This makes the application of the resin composition difficult, and further the strength of the liner is liable to be inadequate. In a case that the content of the (meth) acrylate having the isocyanuric acid ring exceeds 35% by weight, the lubricating property is liable to decrease due to a lower content of a solid lubricant which will be described later.

In addition to first (meth)acrylate compound having the isocyanuric acid ring, the ultraviolet curable resin composition further contains, mainly as a component composing the resin, the second (meth)acrylate compound different from the first (meth)acrylate compound. It is preferred that the total amount of the first (meth)acrylate compound and the second (meth)acrylate compound in the ultraviolet curable resin composition be in the range of 35% by weight to 65% by weight, with respect to the entire amount of the ultraviolet curable resin composition. In a case that the total amount of the first and second (meth)acrylates is less than 35% by weight, the adhesive component is small and thus lowers the adhesive force between the ultraviolet curable resin composition and the metal, which in turn causes the polytetrafluoroethylene resin to easily separate at the time of the cutting and/or the grinding of the self-lubricating liner. On the other hand, in a case that the total amount exceeds 65% by weight, the resin component becomes excessive and thus the fluidity is increased, which in turn causes the ultraviolet curable resin composition to easily drip when it is applied.

Any (meth)acrylate compound different from the first (meth)acrylate compound may be used as the second (meth)acrylate compound. The second (meth)acrylate compound may be a (meth)acrylate compound which does not have the isocyanuric acid ring represented by the formula (1). For example, the (meth)acrylate compounds cited below may be used as the second (meth)acrylate compound. These compounds may be used individually or in any combination of two or more kinds of these compounds.

In addition to the (meth)acrylate having the isocyanuric acid ring, hydroxyethyl(meth)acrylate, hydroxypropyl (meth)acrylate, and isobornyl(meth)acrylate may be contained individually or combining two or more kinds, in an amount of 5% by weight to 20% by weight with respect to the entire amount of the ultraviolet curable resin composition. In a case that the content of the above adhesiveness improver is less than 5% by weight, the adhesion effect is insufficient. In a case that the content of the adhesiveness improver exceeds 20% by weight, there is such a fear that bubbles might be more likely to occur in the resin to form holes after the curing of resin, thereby losing the strength of resin.

In addition to the (meth)acrylate having the isocyanuric acid ring, pentaerythritol triacrylate, pentaerythritol tetraacrylate, dipentaerythritol penta(meth)acrylate, dipentaerythritol hexa(meth)acrylate, and dipentaerythritol polyacrylate may be contained, as a curing accelerator, individually or combining two or more kinds, in an amount of 8% by weight or less with respect to the entire amount of the ultraviolet curable resin composition in order to accelerate curing speed without losing the strength and the heat resistance after the curing. In a case that the content of the curing accelerator exceeds 8% by weight, the resin composition cures so rapidly that it becomes difficult to handle the resin composition at the time of manufacture.

In addition to the (meth)acrylate having the isocyanuric acid ring, bisphenol A-type epoxy modified acrylate may be contained, as a chemical-resisting agent, in an amount of 10% by weight or less with respect to the entire amount of the ultraviolet curable resin composition in order to provide chemical resistance without losing the strength after the curing. Since the bisphenol A-type epoxy modified acrylate has rigidity, when the content of the bisphenol A-type epoxy modified acrylate exceeds 10% by weight, there is such a fear that any cracks might occur in the cured resin.

In addition to the (meth)acrylate having the isocyanuric acid ring, urethane acrylate may be contained, as a toughness-adding agent, in an amount of 2% by weight or less with respect to the entire amount of the ultraviolet curable resin composition in order to provide toughness. Since the urethane acrylate has superior flexibility, when the content of urethane acrylate exceeds 2% by weight, there is such a fear that the mechanical strength might be reduced and the high load capacity might be lost.

As an adjuvant or supplement for cross-linking reaction by UV irradiation of the (meth)acrylate having the isocyanuric acid ring, crosslinkable monomers may be contained individually or combining two or more kinds in an amount of 2% by weight or less with respect to the entire amount of the ultraviolet curable resin composition. As the crosslinkable monomers, monomer having two or more of unsaturated bonds of an equivalent reactive property is used. Examples of the crosslinkable monomer include ethylene glycol di(meth)acrylate, propylene glycol di(meth)acrylate, butylene glycol di(meth)acrylate, hexanediol di(meth)acrylate, tetraethylene glycol di(meth)acrylate, triethylene glycol di(meth)acrylate, and tripropylene glycol di(meth)acrylate.

The resin composition related to the present invention contains a solid lubricant. It is preferred that the transmittance of ultraviolet rays be not impaired by using the solid lubricant when ultraviolet rays are radiated for curing or polymerizing the resin composition. From this viewpoint, polytetrafluoroethylene resin (hereinafter referred to as "PTFE" in an abbreviated manner as appropriate) is used; the PTFE is an organic white solid lubricant.

The PTFE can be contained in an amount of 30% by weight to 50% by weight with respect to the entire amount of the resin composition. PTFE is used in a powder form. The particles of PTFE (PTFE particles) may be surface-treated such that etching is performed on a surface of the PTFE particles by using sodium naphthalene and then the surface is coated with epoxy modified acrylate. Such a surface treatment enhances the affinity for acrylic resin produced from the (meth)acrylate having the isocyanuric acid ring and further strengthens the bond with the acrylic resin. Therefore, in a case that the resin composition related to the present invention is used as the self-lubricating liner, the PTFE particles can be prevented from separating from the self-lubricating liner at the time of the sliding and thus it is possible to reduce the wear amount of the self-lubricating liner.

Due to the difference in the particle size of the PTFE, the strength, the wear resistance, the lubricating property of the self-lubricating liner varies. Using PTFE having a large particle size improves the load capacity and wear resistance of the self-lubricating liner, and using PTFE having a small particle size improves the lubricating property of the self-lubricating liner. In the present invention, the two kinds of PTFE with different particle sizes, namely, first polytetrafluoroethylene (PTFE) resin (hereinafter referred to as "first PTFE)") and second polytetrafluoroethylene (PTFE) resin (hereinafter referred to as "second PTFE)") are used in a mixed manner. The average particle size of the first PTFE is in the range of 75 µm to 180 µm, and the average particle size of the second PTFE is in the range of 1 µm to 15 µm. By using the first PTFE with an average particle size in the range of 75 µm to 180 µm, the load capacity and the wear resistance of the self-lubricating liner can be improved; and by using the second PTFE with an average particle size in the range of 1 µm to 15 µm, the friction coefficient of the self-lubricating liner can be lowered. Further, by using the second PTFE of which particle size is small, the viscosity of the resin composition is increased, thereby making it possible to suppress dripping of the resin at the time of manufacture. In the present invention, when an average particle size is 45 µm or more, the average particle size is measured by JIS Z8815 test sieving. When an average particle size is less than 45 µm, the average particle size is measured by laser diffraction/scattering method. In each of the test sieving and the laser diffraction/scattering method, the "average particle size" means a particle size corresponding to a cumulative % value of 50% in a particle size distribution, namely, median diameter in the cumulative distribution.

In the ultraviolet curable resin composition, the total amount of the first PTFE and the second PTFE is in the range of 30% by weight to 50% by weight with respect to the entire amount of the ultraviolet curable resin composition, wherein the content ratio of the second PTFE to the total amount of the first PTFE and second PTFE is in the range of 20% by weight to 75% by weight. Namely, the second PTFE is contained in the range of 20% by weight to 75% by weight of the total amount of the first PTFE and the second PTFE. Further, the total amount of the first PTFE and second PTFE is preferably in the range of 30% by weight to 40% by weight, and the content ratio of the second PTFE to the total amount of the first PTFE and second PTFE is preferably in the range of 40% by weight to 60% by weight. In a case of using the PTFE having a large particle size (the first PTFE related to the present invention), although the wear resistance and the load capability of the self-lubricating liner are improved, the friction coefficient of the self-lubricating liner tends to be increased. On the other hand, in a case of using the PTFE having a small particle size (the second PTFE related to the present invention), although the friction coefficient of the self-lubricating liner is lowered, the wear resistance and the load capability of the self-lubricating liner tend to be lowered. In the present invention, by using the first PTFE and the second PTFE in the above-described ratio, the friction coefficient of the self-lubricating liner can be lowered while maintaining the load capability and the wear resistance of the self-lubricating liner. Further, the melting point of the first PTFE is preferably higher than the melting point of the second PTFE.

The solid lubricant may include melamine cyanurate, in addition to PTFE. In this case, the melamine cyanurate is desirably contained in an amount of 30% by weight or less with respect to the entire amount of the resin composition, and the melamine cyanurate is further desirably contained in an amount ranging from 3% by weight to 10% by weight. In a case that the content of melamine cyanurate exceeds 30% by weight, although the friction coefficient of the self-lubricating liner becomes lower, the wear amount tends to increase. The structure of melamine cyanurate is a cleavage sliding structure, such as molybdenum disulfide ($MoS_2$) and graphite, in which melamine molecules having six-membered ring structures and cyanuric acid molecules are held together by hydrogen-bonding to be arranged planarly and each of the planes is stacked in layers by weak bonding. It is presumed that such a structure contributes to the solid lubricating property.

In a case that the melamine cyanurate is used in addition to PTFE as the solid lubricant, the total content of the melamine cyanurate and PTFE is desirably in the range of 10% by weight to 55% by weight with respect to the entire amount of the resin composition. In a case that the content of the solid lubricants is less than 10% by weight, the friction coefficient of the self-lubricating liner becomes higher and the wear amount increases. In a case that the content of the solid lubricants exceeds 55% by weight, the strength of the self-lubricating liner becomes insufficient, which may cause plastic deformation.

The use of melamine cyanurate together with PTFE can reduce the friction coefficient of the self-lubricating liner as compared with a case in which PTFE is used individually as the solid lubricant. In special, it has been found out that the friction coefficient of the self-lubricating liner can be reduced by approximately 10%, as compared with the case in which PTFE is used individually, by making the total content of melamine cyanurate and PTFE be in the range of 30% by weight to 40% by weight. Further, since the melamine cyanurate is white, even if the melamine cyanurate is added to the resin composition, no negative influence is provided on the transmittance of ultraviolet rays. Thus, the melamine cyanurate is suitable as the solid lubricant.

In order to accelerate the polymerization reaction of the (meth)acrylate having the isocyanuric acid ring with ultraviolet rays, a photopolymerization initiator is desirably contained in an amount of 0.01% by weight to 5% by weight with respect to the weight of (meth)acrylate having the isocyanuric acid ring. Examples of the photopolymerization initiator include benzophenone, 4,4-bis(diethylamino)benzophenone, 2,4,6-trimethylbenzophenone, methylortho benzoyl benzoate, 4-phenyl benzophenone, t-butyl anthraquinone, 2-ethyl anthraquinone, diethoxy acetophenone, 2-hydroxy-2-methyl-1-phenylpropane-1-one, benzyl dimethyl ketal, 1-hydroxy cyclohexyl-phenylketone, benzoin methyl ether, benzoin ethyl ether, benzoin isopropyl ether, benzoin isobutyl ether, 2-methyl-[4-(methylthio)phenyl]-2-morpholino-1-propanone, 2-benzyl-2-dimethylamino-1-(4-morpholino phenyl)butanone-1, diethyl thioxanthone, isopropyl thioxanthone, 2,4,6-trimethylbenzoyl diphenylphosphine oxide, bis(2,6-dimethoxy benzoyl)-2,4, 4-trimethylpentyl phosphine oxide, bis(2,4,6-trimethylbenzoyl)phenylphosphine oxide, 2-hydroxy-1-[4-[4-(2-hydroxy-2-methylpropionyl)benzyl]phenyl]-2-methylpropane-1-one, and methyl benzoylformate. The above examples of the photopolymerization initiator may be used individually or in combination. The photopolymerization initiator, however, is not limited to these.

Glass fiber may be added to the resin composition related to the present invention in order to improve the strength of the self-lubricating liner. It is preferred that the glass fiber be added in an amount of 15% by weight or less with respect to the entire amount of the resin composition. In a case that the amount of addition of the glass fiber in the resin composition exceeds 15% by weight, the wear on a surface of a mating material is more likely to be encouraged by the glass fiber which was cut at the time of the cutting and/or the grinding of the self-lubricating liner. This could compromise the advantages as the machinable liner. The use of glass fiber is advantageous in that the transmittance of ultraviolet rays is not reduced thereby.

The resin composition related to the present invention may further contain a phosphate. The phosphate improves initial conformability at the time of using the resin composition as the self-lubricating liner and can stabilize the friction coefficient early as compared with a case in which no phosphate is added. It is preferred that the phosphate be contained in an amount of 1% by weight to 5% by weight with respect to the entire amount of the resin composition. The phosphate is exemplified by tertiary phosphate, secondary phosphate, pyrophosphate, phosphite, or metaphosphate, of alkali metal or alkali earth metal. In particular, the phosphate is exemplified, for example, by trilithium phosphate, dilithium hydrogen phosphate, sodium hydrogenphosphate, lithium pyrophosphate, tricalcium phosphate, calcium monohydrogen phosphate, calcium pyrophosphate, lithium metaphosphate, magnesium metaphosphate, and calcium metaphosphate.

The resin composition related to the present invention may contain fumed silica. The fumed silica is used to provide thixotropy. If the resin composition has poor thixotropy, dripping is caused when the resin composition is applied on the sliding surface, which makes the formation of liner difficult. Therefore, the fumed silica can be added to adjust the thixotropy. It is preferred that the fumed silica be contained in an amount of 5% by weight or less with respect to the entire amount of the resin composition. In a case that the amount of addition of the fumed silica exceeds 5% by weight, the wear amount of the liner increases, which is not preferred.

The resin composition related to the present invention is desirably in a liquid form at room temperature. Accordingly, the resin composition can be applied on the sliding surface of the sliding member easily, and after the application, the resin composition can be cured by being irradiated with ultraviolet rays.

Depending on the application of the resin composition related to the present invention, a thermosetting agent may be further added to the resin composition, so that the secondary curing of the resin composition can be achieved by heat after the primary curing of the resin composition is achieved by ultraviolet irradiation. This cures the resin composition completely, and thereby improving the wear resistance thereof. The thermosetting agent is exemplified, for example, by organic peroxide such as diisopropyl peroxydicarbonate, benzoyl peroxide, methylethylketone peroxide, cyclohexanone peroxide, t-butyl peroxy-2-ethylhexanoate, 1,1,3,3-tetramethylbutyl peroxy-2-ethylhexanoate, t-amyl peroxy-2-ethylhexanoate, t-butylhydro peroxide, tert-butyl peroxy neodecanoate, t-butyl peroxybenzoate, cumene hydroperoxide; and azo compounds such as 2,2'-azobisisobutyronitrile and 2,2'-azobisdiethyl valeronitrile. However, the thermosetting agent is not limited to these.

In addition to the above, it is possible to add various additives such as an antioxidant, a photostabilizer, a polymerization inhibitor, and a preservation stabilizer to the resin composition related to the present invention as needed. It is desired that the total amount of addition of the additive(s) and the thermosetting agent be 5% by weight or less with respect to the entire amount of the resin composition.

In the resin composition related to the present invention, the ultraviolet curable resin in the liquid form is used as a base resin. Thus, the resin composition is easily mixed with the solid lubricant including PTFE, and PTFE can be added in a high content of 30% by weight to 50% by weight. PTFE cannot be added in such a high content in a case where thermoplastic resin is used as the base resin. Therefore, it is possible to produce the self-lubricating liner having lower friction and less-wearing.

In the present invention, there is also provided a manufacturing method for producing a sliding member with a self-lubricating liner, which is obtained by applying the ultraviolet curable resin composition containing the first (meth)acrylate compound having the isocyanuric acid ring represented by the above-described formula (1), the second (meth)acrylate compound different from the first (meth)acrylate compound, and the first PTFE and the second PTFE each as the solid lubricant on the sliding surface of the sliding member and then curing the ultraviolet curable resin composition by ultraviolet irradiation. The self-lubricating liner is a machinable liner which can be subjected to after-processing through the grinding or the cutting to obtain a desired size.

The sliding member related to the present invention may be a spherical bearing provided with an outer race member having a concave first bearing surface and an inner race member having a convex second bearing surface slidably movable on the first bearing surface. In a case that such a spherical bearing is manufactured, firstly the ultraviolet curable resin composition according to an embodiment related to the present invention is applied on the first bearing surface or the second bearing surface which are the sliding surfaces. Subsequently, the ultraviolet curable resin composition applied on the first bearing surface or the second bearing surface is semi-cured by being irradiated with ultraviolet rays. Thereafter, the inner race member is inserted in the outer race member and the outer race member is pressed to be plastically deformed so as to follow the convex surface of the inner race member. Then, the ultraviolet curable resin composition is completely cured by heating. Accordingly, the self-lubricating liner can be formed. In this case, it is preferred that the ultraviolet curable resin composition contain the thermosetting agent.

As described above, the ultraviolet curable resin composition related to the present invention contains the two kinds of polytetrafluoroethylene resins at an appropriate content ratio. Thus, it is possible to produce a self-lubricating liner satisfying the tree characteristics that are the high load capacity, wear resistance, low friction coefficient, at the same time. Further, the ultraviolet curable resin composition related to the present invention is applied on the sliding surface, and then it can be cured in a short time by an ultraviolet irradiation. Since high temperature/high pressure conditions as when thermoplastic resin is used are not necessary, a relatively large amount of polytetrafluoroethylene resin can be added, which makes it easy to handle the parts. Further, since the adherence of the cured resin composition to an application-target surface (base surface) is extremely strong, a process for roughening the application-target surface previously is not necessary. Accordingly, the safety of work and power saving can be improved and equipment cost can be lowered. Furthermore, since the cured resin composition can be subjected to cutting or grinding easily, it is possible to provide a machinable liner which can be subjected to after-processing such as a size adjustment. The manufacturing method for producing the sliding member related to the present invention is capable of easily manufacturing bearings such as a reamer bolt and a spherical bearing with a self-lubricating liner formed on a sliding surface of an outer race member or an inner race member, at low cost with high precision.

EXAMPLES

A resin composition related to the present invention and a sliding member provided with a self-lubricating liner composed of the resin composition related to the present invention will be explained based on the following examples. However, the present invention is not limited to the following examples.

<Manufacture of Ultraviolet Curable Resin Composition>

Example 1

There was prepared a resin composition in a liquid form to have the composition as shown in TABLE 1 by mixing: a mixture of di-(2-acryloxyethyl)isocyanurate and tris-(2-acryloxyethyl)isocyanulate (FA-731AT, produced by Hitachi Chemical Co., Ltd.) as the first (meth)acrylate compound having the isocyanuric acid ring; bisphenol A-type epoxy acrylate (EBECRYL3700 produced by Daicel-Cytec Co., Ltd.), dipentaerythritol hexaacrylate (A-DPH, produced by Shin-Nakamura Chemical Co., Ltd.), isobornyl methacrylate (Light Ester IB-X, produced by Kyoeisha Chemical Co., Ltd.), hydroxyethyl methacrylate (Light Ester HO-250M, produced by Kyoeisha Chemical Co., Ltd.) and ethylene glycol dimethacrylate (1G, produced by Shin-Nakamura Chemical Co., Ltd.) as the second (meth) acrylate compound; melamine cyanurate (MELAPUR MC25, produced by BASF Japan Ltd.), first PTFE (KT-60, produced by Kitamura Limited, average particle size: 130 μm, melting point: 328 degrees Celsius), and second PTFE (KTL-10S, produced by Kitamura Limited, average particle size: 10 μm, melting point: 321 degrees Celsius), as solid lubricants; 2-hydroxy-2-methyl-1-phenylpropane-1-one (DAROCUR 1173, produced by BASF Japan Ltd.) as a photopolymerization initiator; glass fiber (SS05DE-413, produced by Nitto Boseki Co., Ltd., mean fiber length: 80 μm x mean diameter ϕ6.5 μm); fumed silica (AEROSIL R972, produced by Nippon Aerosil Co., Ltd.); and additives. As the additives, an antioxidant, a photostabilizer, a polymerization inhibitor, and a preservation stabilizer were respectively included in small amounts in Example 1. The total content of the above additives in the resin composition is shown in TABLE 1. Note that, however, Examples 1 to 4 further contain a thermosetting agent in addition to the above additives.

Example 2 di-(2-acryloxyethyl)isocyanurate, tris-(2-acryloxyethyl) isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KT-60, PTFE KTL-10S, the photopolymerization initiator, the glass fiber, the humed silica and the additives were used in respective weight ratios (% by weight) described in columns of Example 2 of TABLE 1, and a resin composition was prepared in a similar manner as the preparation of the resin composition of Example 1.

Example 3 di-(2-acryloxyethyl)isocyanurate, tris-(2-acryloxyethyl) isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KT-60, PTFE KTL-10S, the photopolymerization initiator, the glass fiber, the humed silica and the additives were used in respective weight ratios (% by weight) described in columns of Example 3 of TABLE 1, and a resin composition was prepared in a similar manner as the preparation of the resin composition of Example 1.

Example 4 di-(2-acryloxyethyl)isocyanurate, tris-(2-acryloxyethyl) isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KT-60, PTFE KTL-10S, the photopolymerization initiator, the glass fiber, the humed silica and the additives were used in respective weight ratios (% by weight) described in columns of Example 4 of TABLE 1, and a resin composition was prepared in a similar manner as the preparation of the resin composition of Example 1.

Example 5 di-(2-acryloxyethyl)isocyanurate, tris-(2-acryloxyethyl) isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KT-60, PTFE KTL-10S, the photopolymerization initiator, the glass fiber, the humed silica and the additives were used in respective weight ratios (% by weight) described in columns of Example 5 of TABLE 1, and a resin composition was prepared in a similar manner as the preparation of the resin composition of Example 1.

Example 6 di-(2-acryloxyethyl)isocyanurate, tris-(2-acryloxyethyl) isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KT-60, PTFE KTL-10S, the photopolymerization initiator, the glass fiber, the humed silica and the additives were used in respective weight ratios (% by weight) described in columns of Example 6 of TABLE 1, and a resin composition was prepared in a similar manner as the preparation of the resin composition of Example 1.

Example 7 di-(2-acryloxyethyl)isocyanurate, tris-(2-acryloxyethyl) isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KT-60, PTFE KTL-10S, the photopolymerization initiator, the glass fiber, the humed silica and the additives were used in respective weight ratios (% by weight) described in columns of Example 7 of TABLE 1, and a resin composition was prepared in a similar manner as the preparation of the resin composition of Example 1.

Example 8 di-(2-acryloxyethyl)isocyanurate, tris-(2-acryloxyethyl) isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KT-60, the photopolymerization initiator, the glass fiber, the humed silica and the additives were used in respective weight ratios (% by weight) described in columns of Example 8 of TABLE 1, and a resin composition was prepared in a similar manner as the preparation of the resin composition of Example 1, except that PTFE KTL-8FH (produced by Kitamura Limited, average particle size: 3.5 µm, melting point: 321 degrees Celsius) was used instead of PTFE KTL-10S.

Example 9 di-(2-acryloxyethyl)isocyanurate, tris-(2-acryloxyethyl) isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KT-60, the photopolymerization initiator, the glass fiber, the humed silica and the additives were used in respective weight ratios (% by weight) described in columns of Example 9 of TABLE 1, and a resin composition was prepared in a similar manner as the preparation of the resin composition of Example 1, except that PTFE Zonyl MP1300 (produced by Du Pont Inc., average particle size: 12 µm, melting point: 325 degrees Celsius) was used instead of PTFE KTL-10S.

Example 10 di-(2-acryloxyethyl)isocyanurate, tris-(2-acryloxyethyl) isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KTL-10S, the photopolymerization initiator, the glass fiber, the humed silica and the additives were used in respective weight ratios (% by weight) described in columns of Example 10 of TABLE 1, and a resin composition was prepared in a similar manner as the preparation of the resin composition of Example 1, except that PTFE KT-60 with in-house adjusted particle size(average particle size: 80 µm) was used instead of the original PTFE KT-60 (average particle size: 130 µm).

Example 11 di-(2-acryloxyethyl)isocyanurate, tris-(2-acryloxyethyl) isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KTL-10S, the photopolymerization initiator, the glass fiber, the humed silica and the additives were used in respective weight ratios (% by weight) described in columns of Example 11 of TABLE 1, and a resin composition was prepared in a similar manner as the preparation of the resin composition of Example 1, except that PTFE KT-40H (produced by Kitamura Limited, average particle size: 160 µm, melting point: 327 degrees Celsius) was used instead of PTFE KT-60.

Example 12 di-(2-acryloxyethyl)isocyanurate, tris-(2-acryloxyethyl) isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KT-60, PTFE KTL-10S, the photopolymerization initiator, the glass fiber, the humed silica and the additives were used in respective weight ratios (% by weight) described in columns of Example 12 of TABLE 1, and a resin composition was prepared in a similar manner as the preparation of the resin composition of Example 1.

Example 13 di-(2-acryloxyethyl)isocyanurate, tris-(2-acryloxyethyl) isocyanurate, bisphenol A-type epoxy acrylate, dipentaerythritol hexaacrylate, isobornyl methacrylate, hydroxyethyl methacrylate, ethylene glycol dimethacrylate, melamine cyanurate, the photopolymerization initiator, the glass fiber, the humed silica and the additives were used in respective weight ratios (% by weight) described in columns of Example 13 of TABLE 1, and a resin composition was prepared in a similar manner as the preparation of the resin composition of Example 1, except that PTFE KT-60 with in-house adjusted particle size (average particle size: 80 µm) was used instead of original PTFE KT-60 (average particle size: 130 µm), and that PTFE KTL-8FH (average particle size: 3.5 µm, melting point: 321 degrees Celsius) was used instead of PTFE KTL-10S.

Example 14

ε-caprolactone modified tris-(2-acryloxyethyl)isocyanurate (A-9300-1CL, produced by Shin-Nakamura Chemical Co., Ltd.) was used as the first (meth)acrylate compound, instead of the mixture of di-(2-acryloxyethyl)isocyanurate and tris-(2-acryloxyethyl)isocyanulate, and bisphenol A-type epoxy acrylate, dipentaerythritol hexaacrylate, isobornyl methacrylate, hydroxyethyl methacrylate, ethylene glycol dimethacrylate, melamine cyanurate, PTFE KT-60, PTFE KTL-10S, the photopolymerization initiator, the glass fiber, the humed silica and the additives were used in respective weight ratios (% by weight) described in columns of Example 14 of TABLE 1, and a resin composition was prepared in a similar manner as the preparation of the resin composition of Example 1.

Example 15

Di-(2-acryloxyethyl)isocyanurate (M-215, produced by Toagosei Co., Ltd.) was used as the first (meth)acrylate compound, instead of the mixture of di-(2-acryloxyethyl)isocyanurate and tris-(2-acryloxyethyl)isocyanulate, and bisphenol A-type epoxy acrylate, dipentaerythritol hexaacrylate, isobornyl methacrylate, hydroxyethyl methacrylate, ethylene glycol dimethacrylate, melamine cyanurate, PTFE KT-60, PTFE KTL-10S, the photopolymerization initiator, the glass fiber, the humed silica and the additives were used in respective weight ratios (% by weight) described in columns of Example 15 of TABLE 1, and a resin composition was prepared in a similar manner as the preparation of the resin composition of Example 1.

Comparative Example 1 di-(2-acryloxyethyl)isocyanurate, tris-(2-acryloxyethyl)isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KT-60, the photopolymerization initiator, the glass fiber, the humed silica and the additives were used in respective weight ratios (% by weight) described in columns of Comparative Example 1 of TABLE 2, and a resin composition was prepared in a similar manner as the preparation of the resin composition of Example 1, except that PTFE KTL-10S was not used.

Comparative Example 2 di-(2-acryloxyethyl)isocyanurate, tris-(2-acryloxyethyl)isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KT-60, PTFE KTL-10S, the photopolymerization initiator, the glass fiber, the humed silica and the additives were used in respective weight ratios (% by weight) described in columns of Comparative Example 2 of TABLE 2, and a resin composition was prepared in a similar manner as the preparation of the resin composition of Example 1.

Comparative Example 3 di-(2-acryloxyethyl)isocyanurate, tris-(2-acryloxyethyl)isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KTL-10S, the photopolymerization initiator, the glass fiber, the humed silica and the additives were used in respective weight ratios (% by weight) described in columns of Comparative Example 3 of TABLE 2, and a resin composition was prepared in a similar manner as the preparation of the resin composition of Example 1, except that PTFE KT-60 was not used.

Comparative Example 4 di-(2-acryloxyethyl)isocyanurate, tris-(2-acryloxyethyl)isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KT-60, the photopolymerization initiator, the glass fiber, the humed silica and the additives were used in respective weight ratios (% by weight) described in columns of Comparative Example 4 of TABLE 2, and a resin composition was prepared in a similar manner as the preparation of the resin composition of Example 1, except that PTFE KTL-10S was not used.

Comparative Example 5 di-(2-acryloxyethyl)isocyanurate, tris-(2-acryloxyethyl)isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KT-60, PTFE KTL-10S, the photopolymerization initiator, the glass fiber, the humed silica and the additives were used in respective weight ratios (% by weight) described in columns of Comparative Example 5 of TABLE 2, and a resin composition was prepared in a similar manner as the preparation of the resin composition of Example 1.

Comparative Example 6 di-(2-acryloxyethyl)isocyanurate, tris-(2-acryloxyethyl)isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KT-60, PTFE KTL-10S, the photopolymerization initiator, the glass fiber, the humed silica and the additives were used in respective weight ratios (% by weight) described in columns of Comparative Example 6 of TABLE 2, and a resin composition was prepared in a similar manner as the preparation of the resin composition of Example 1.

Comparative Example 7 di-(2-acryloxyethyl)isocyanurate, tris-(2-acryloxyethyl)isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KT-60, PTFE KTL-10S, the photopolymerization initiator, the glass fiber, the humed silica and the additives were used in respective weight ratios (% by weight) described in columns of Comparative Example 7 of TABLE 2, and a resin composition was prepared in a similar manner as the preparation of the resin composition of Example 1.

Comparative Example 8 di-(2-acryloxyethyl)isocyanurate, tris-(2-acryloxyethyl)isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KTL-10S, the photopolymerization initiator, the glass fiber, the humed silica and the additives were used in respective weight ratios (% by weight) described in columns of Comparative Example 8 of TABLE 2, and a resin composition was prepared in a similar manner as the preparation of the resin composition of Example 1, except that PTFE KT-60 was not used.

Comparative Example 9 di-(2-acryloxyethyl)isocyanurate, tris-(2-acryloxyethyl)isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KT-60, the photopolymerization initiator, the glass fiber, the humed silica and the additives were used in respective weight ratios (% by weight) described in columns of Comparative Example 9 of TABLE 2, and a resin composition was prepared in a similar manner as the preparation of the resin composition of Example 1, except that PTFE KTL-10S was not used.

Comparative Example 10 di-(2-acryloxyethyl)isocyanurate, tris-(2-acryloxyethyl)isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KTL-10S, the photopolymerization initiator, the glass fiber, the humed silica and the additives were used in respective weight ratios (% by weight) described in columns of Comparative Example 10 of TABLE 2, and a resin composition was prepared in a similar manner as the preparation of the resin composition of Example 1, except that PTFE KT-60 was not used.

Comparative Example 11 di-(2-acryloxyethyl)isocyanurate, tris-(2-acryloxyethyl)isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KT-60, the photopolymerization initiator, the glass fiber, the humed silica and the additives were used in respective weight ratios (% by weight) described in columns of Comparative Example 11 of TABLE 2, and a resin composition was prepared in a similar manner as the preparation of the resin composition of Example 1, except that PTFE KTL-10S was not used.

Comparative Example 12 di-(2-acryloxyethyl)isocyanurate, tris-(2-acryloxyethyl)isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KTL-10S, the photopolymerization initiator, the glass fiber, the humed silica and the additives were used in respective weight ratios (% by weight) described in columns of Comparative Example 12 of TABLE 2, and a resin composition was prepared in a similar manner as the preparation of the resin composition of Example 1, except that PTFE KT-60 was not used.

Comparative Example 13 di-(2-acryloxyethyl)isocyanurate, tris-(2-acryloxyethyl)isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KT-60, the photopolymerization initiator, the glass fiber, the humed silica and the additives were used in respective weight ratios (% by weight) described in columns of Comparative Example 13 of TABLE 2, and a resin composition was prepared in a similar manner as the preparation of the resin composition of Example 1, except that PTFE KTL-10S was not used.

Comparative Example 14 di-(2-acryloxyethyl)isocyanurate, tris-(2-acryloxyethyl)isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KTL-10S, the photopolymerization initiator, the glass fiber, the humed silica and the additives were used in respective weight ratios (% by weight) described in columns of Comparative Example 14 of TABLE 2, and a resin composition was prepared in a similar manner as the preparation of the resin composition of Example 1, except that PTFE M-12 (produced by Daikin Industries., Ltd., average particle size: 50 µm, melting point: 327 degrees Celsius) was used, instead of using PTFE KT-60.

Comparative Example 15 di-(2-acryloxyethyl)isocyanurate, tris-(2-acryloxyethyl)isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KT-60, PTFE KTL-10S, the photopolymerization initiator, the glass fiber, the humed silica and the additives were used in respective weight ratios (% by weight) described in columns of Comparative Example 15 of TABLE 2, and a resin composition was prepared in a similar manner as the preparation of the resin composition of Example 1.

Comparative Example 16 di-(2-acryloxyethyl)isocyanurate, tris-(2-acryloxyethyl)isocyanurate, bisphenol A-type epoxy acrylate, dipentaerythritol hexaacrylate, isobornyl methacrylate, hydroxyethyl methacrylate, ethylene glycol dimethacrylate, melamine cyanurate, PTFE KTL-10S, the photopolymerization initiator, the glass fiber, the humed silica and the additives were used in respective weight ratios (% by weight) described in columns of Comparative Example 16 of TABLE 2, and a resin composition was prepared in a similar manner as the preparation of the resin composition of Example 1, except that PTFE KT-60 was not used.

Comparative Example 17 di-(2-acryloxyethyl)isocyanurate, tris-(2-acryloxyethyl)isocyanurate, bisphenol A-type epoxy acrylate, dipentaerythritol hexaacrylate, isobornyl methacrylate, hydroxyethyl methacrylate, ethylene glycol dimethacrylate, melamine cyanurate, the photopolymerization initiator, the glass fiber, the humed silica and the additives were used in respective weight ratios (% by weight) described in columns of Comparative Example 17 of TABLE 2, and a resin composition was prepared in a similar manner as the preparation of the resin composition of Example 1, except that PTFE KTL-8N (produced by Kitamura Limited, average particle size: 3.5 μm, melting point: 321 degrees Celsius) and PTFE Fluon (trademark) G163 (produced by Asahi Glass Co., Ltd., average particle size: 25 μm, melting point: 343 degrees Celsius) were used instead of PTFE KT-60 and PTFE KTL-10S.

Comparative Example 18 di-(2-acryloxyethyl)isocyanurate, tris-(2-acryloxyethyl)isocyanurate, bisphenol A-type epoxy acrylate, dipentaerythritol hexaacrylate, isobornyl methacrylate, hydroxyethyl methacrylate, ethylene glycol dimethacrylate, melamine cyanurate, the photopolymerization initiator, the glass fiber, the fumed silica and the additives were used in respective weight ratios (% by weight) described in columns of Comparative Example 18 of TABLE 2, and a resin composition was prepared in a similar manner as the preparation of the resin composition of Example 1, except that PTFE KTL-8N (produced by Kitamura Limited, average particle size: 3.5 μm, melting point: 321 degrees Celsius) and PTFE Fluon (trademark) G163 (produced by Asahi Glass Co., Ltd., average particle size: 25 μm, melting point: 343 degrees Celsius) were used instead of PTFE KT-60 and PTFE KTL-10S.

The total amount of the first (meth)acrylate compound and the second (meth)acrylate compound in the resin composition of each of Examples 1 to 15 and Comparative Examples 1 to 18 as described above is indicated in TABLE 4 or TABLE 5. Further, the total amount of the first PTFE and the second PTFE in the resin composition and the content ratio of the second PTFE with respect to the total amount of the first PTFE and the second PTFE in the resin composition of each of Examples 1 to 15 and Comparative Examples 1 to 13, 15 and 16 are indicated in TABLE 4 or TABLE 5. Note that the first PTFE having the average particle size in the range of 75 μm to 180 μm was not used in Comparative Examples 14, 17 and 18. Instead of using the first PTFE, Comparative Example 14 used PTFE M-12 with an average particle size of 50 μm and Comparative Examples 17 and 18 each used PTFE G163 with an average particle size of 25 μm. In order to emphasize this detail, regarding Comparative Examples 14, 17 and 18, the total amount of the two kinds of PTFEs and the content ratio of the second PTFE with respect to the total amount of the two kinds of the PTFEs are indicated within parenthesis in TABLE 5.

TABLES 1 and 2 (following)-LEGEND

DAEIC: di-(2-acryloxyethyl)isocyanurate
TAEIC: tris-(2-acryloxyethyl)isocyanurate
CTAI: ε-caprolactone modified tris-(2-acryloxyethyl)isocyanurate
BEA: bisphenol A-type epoxy acrylate
DPHA: dipentaerythritol hexaacrylate
IBXMA: isobornyl methacrylate
HEMA: hydroxyethyl methacrylate
EGDM: ethylene glycol dimethacrylate
MC: melamine cyanurate resin
PI: photopolymerization initiator
PTFE: polytetrafluoroethylene resin
GF: glass fiber
FS: fumed silica

TABLE 1

| | Ultraviolet curable resin composition (% by weight) | | | | | | | | | | |
|---|---|---|---|---|---|---|---|---|---|---|---|
| | First (meth)acrylate compound | | | Second (meth)acrylate compound | | | | | | | |
| Example | DAEIC | TAEIC | CTAI | BEA | DPHA | IBXMA | HEMA | EGDM | PI | Additives | MC |
| 1 | 9.7 | 23.9 | — | 6.5 | 5.2 | 1.9 | 9.4 | 1.0 | 0.6 | 2.6 | 3 |
| 2 | 8.1 | 20.0 | — | 5.4 | 4.3 | 1.6 | 7.9 | 0.9 | 0.5 | 2.2 | 3 |
| 3 | 8.1 | 20.0 | — | 5.4 | 4.3 | 1.6 | 7.9 | 0.9 | 0.5 | 2.2 | 3 |
| 4 | 8.1 | 20.0 | — | 5.4 | 4.3 | 1.6 | 7.9 | 0.9 | 0.5 | 2.2 | 3 |
| 5 | 6.5 | 16.1 | — | 4.4 | 3.5 | 1.3 | 6.4 | 0.7 | 0.4 | 1.7 | 3 |
| 6 | 6.5 | 16.1 | — | 4.4 | 3.5 | 1.3 | 6.4 | 0.7 | 0.4 | 1.7 | 3 |
| 7 | 6.5 | 16.1 | — | 4.4 | 3.5 | 1.3 | 6.4 | 0.7 | 0.4 | 1.7 | 3 |
| 8 | 8.1 | 20.0 | — | 5.4 | 4.3 | 1.6 | 7.9 | 0.9 | 0.5 | 2.2 | 3 |
| 9 | 8.1 | 20.0 | — | 5.4 | 4.3 | 1.6 | 7.9 | 0.9 | 0.5 | 2.2 | 3 |
| 10 | 8.1 | 20.0 | — | 5.4 | 4.3 | 1.6 | 7.9 | 0.9 | 0.5 | 2.2 | 3 |
| 11 | 8.1 | 20.0 | — | 5.4 | 4.3 | 1.6 | 7.9 | 0.9 | 0.5 | 2.2 | 3 |
| 12 | 4.6 | 11.4 | — | 6.5 | 5.2 | 2.0 | 9.5 | 1.0 | 0.4 | 1.4 | 3 |
| 13 | 9.7 | 23.9 | — | 7.1 | 6.5 | 2.6 | 10.4 | 1.1 | 0.6 | 2.0 | 3 |
| 14 | — | — | 33.6 | 6.5 | 5.2 | 1.9 | 9.4 | 1.0 | 0.6 | 2.6 | 3 |
| 15 | 33.6 | — | — | 6.5 | 5.2 | 1.9 | 9.4 | 1.0 | 0.6 | 2.6 | 3 |

| | Ultraviolet curable resin composition (% by weight) | | | | | | | |
|---|---|---|---|---|---|---|---|---|
| | First PTFE (Average particle size) (Melting point) | | | Second PTFE (Average particle size) (Melting point) | | | | |
| | | PTFE with in-house | | | | | | |
| Example | KT-60 (130 μm) (328° C.) | adjusted size (80 μm) (328° C.) | KT-40H (160 μm) (327° C.) | KTL-10S (10 μm) (321° C.) | KTL-8FH (3.5 μm) (321° C.) | Zonyl MP1300 (12 μm) (325° C.) | GF | FS |
| 1 | 15 | — | — | 15 | — | — | 5 | 1 |
| 2 | 30 | — | — | 10 | — | — | 5 | 1 |
| 3 | 20 | — | — | 20 | — | — | 5 | 1 |
| 4 | 10 | — | — | 30 | — | — | 5 | 1 |

TABLE 1-continued

| | | | | | | | | | |
|---|---|---|---|---|---|---|---|---|---|
| 5 | 40 | — | — | 10 | — | — | 5 | 1 | |
| 6 | 30 | — | — | 20 | — | — | 5 | 1 | |
| 7 | 20 | — | — | 30 | — | — | 5 | 1 | |
| 8 | 20 | — | — | — | 20 | — | 5 | 1 | |
| 9 | 20 | — | — | — | — | 20 | 5 | 1 | |
| 10 | — | 20 | — | 20 | — | — | 5 | 1 | |
| 11 | — | — | 20 | 20 | — | — | 5 | 1 | |
| 12 | 20 | — | — | 30 | — | — | 4 | 1 | |
| 13 | — | 15 | — | — | 15 | — | 2 | 1 | |
| 14 | 15 | — | — | 15 | — | — | 5 | 1 | |
| 15 | 15 | — | — | 15 | — | — | 5 | 1 | |

TABLE 2

| | Ultraviolet curable resin composition (% by weight) | | | | | | | | | |
|---|---|---|---|---|---|---|---|---|---|---|
| | First (meth)acrylate compound | | Second (meth)acrylate compound | | | | | | | |
| Comparative Example | DAEIC | TAEIC | BEA | DPHA | IBXMA | HEMA | EGDM | PI | Additives | MC |
| 1 | 12.9 | 31.8 | 8.6 | 6.9 | 2.6 | 12.5 | 1.4 | 0.9 | 3.4 | 3 |
| 2 | 12.9 | 31.8 | 8.6 | 6.9 | 2.6 | 12.5 | 1.4 | 0.9 | 3.4 | 3 |
| 3 | 12.9 | 31.8 | 8.6 | 6.9 | 2.6 | 12.5 | 1.4 | 0.9 | 3.4 | 3 |
| 4 | 11.3 | 27.8 | 7.6 | 6.0 | 2.3 | 11.0 | 1.2 | 0.8 | 3.0 | 3 |
| 5 | 11.3 | 27.8 | 7.6 | 6.0 | 2.3 | 11.0 | 1.2 | 0.8 | 3.0 | 3 |
| 6 | 11.3 | 27.8 | 7.6 | 6.0 | 2.3 | 11.0 | 1.2 | 0.8 | 3.0 | 3 |
| 7 | 11.3 | 27.8 | 7.6 | 6.0 | 2.3 | 11.0 | 1.2 | 0.8 | 3.0 | 3 |
| 8 | 11.3 | 27.8 | 7.6 | 6.0 | 2.3 | 11.0 | 1.2 | 0.8 | 3.0 | 3 |
| 9 | 9.7 | 23.9 | 6.5 | 5.2 | 1.9 | 9.4 | 1.0 | 0.6 | 2.6 | 3 |
| 10 | 9.7 | 23.9 | 6.5 | 5.2 | 1.9 | 9.4 | 1.0 | 0.6 | 2.6 | 3 |
| 11 | 8.1 | 20.0 | 5.4 | 4.3 | 1.6 | 7.9 | 0.9 | 0.5 | 2.2 | 3 |
| 12 | 8.1 | 20.0 | 5.4 | 4.3 | 1.6 | 7.9 | 0.9 | 0.5 | 2.2 | 3 |
| 13 | 6.5 | 16.1 | 4.4 | 3.5 | 1.3 | 6.4 | 0.7 | 0.4 | 1.7 | 3 |
| 14 | 8.1 | 20.0 | 5.4 | 4.3 | 1.6 | 7.9 | 0.9 | 0.5 | 2.2 | 3 |
| 15 | 6.5 | 16.1 | 4.4 | 3.5 | 1.3 | 6.4 | 0.7 | 0.4 | 1.7 | 3 |
| 16 | 6.5 | 16.1 | 4.4 | 3.5 | 1.3 | 6.4 | 0.7 | 0.4 | 1.7 | 3 |
| 17 | 8.1 | 20.0 | 5.4 | 4.3 | 1.6 | 7.9 | 0.9 | 0.5 | 2.2 | 3 |

| | Ultraviolet curable resin composition (% by weight) | | | | | | |
|---|---|---|---|---|---|---|---|
| | First PTFE (Average particle size) (Melting point) | Second PTFE (Average particle size) (Melting point) | | PTFE (Average particle size) (Melting point) | | | |
| Comparative Example | KT-60 (130 μm) (328° C.) | KTF-10S (10 μm) (321° C.) | KTF-8N (3.5 μm) (321° C.) | M-12 (50 μm) (327° C.) | G163 (25 μm) (343° C.) | GF | FS |
| 1 | 10 | — | — | — | — | 5 | 1 |
| 2 | 5 | 5 | — | — | — | 5 | 1 |
| 3 | — | 10 | — | — | — | 5 | 1 |
| 4 | 20 | — | — | — | — | 5 | 1 |
| 5 | 15 | 5 | — | — | — | 5 | 1 |
| 6 | 10 | 10 | — | — | — | 5 | 1 |
| 7 | 5 | 15 | — | — | — | 5 | 1 |
| 8 | — | 20 | — | — | — | 5 | 1 |
| 9 | 30 | — | — | — | — | 5 | 1 |
| 10 | — | 30 | — | — | — | 5 | 1 |
| 11 | 40 | — | — | — | — | 5 | 1 |
| 12 | — | 40 | — | — | — | 5 | 1 |
| 13 | 50 | — | — | — | — | 5 | 1 |
| 14 | — | 20 | — | 20 | — | 5 | 1 |
| 15 | 10 | 40 | — | — | — | 5 | 1 |
| 16 | — | 50 | — | — | — | 5 | 1 |
| 17 | — | — | 20 | — | 20 | 5 | 1 |
| 18 | — | — | 10 | — | 30 | 5 | 1 |

<Manufacture of Self-Lubricating Liner>

A cylindrical sleeve bearing (width (length in the axial direction) 12.7 mm, outer diameter 30.2 mm, inner diameter 24.9 mm) as shown in FIG. 1 was manufactured by using a material obtained by subjecting SUS630 stainless steel to heat treatment under H1150 condition. The resin composition prepared in each of Examples 1 to 15 and Comparative Examples 1 to 18 was uniformly applied on the inner circumferential surface of this sleeve bearing by using a dispenser. Subsequently, the applied resin composition was irradiated with ultraviolet rays (λ=365 nm) for 1 minute by using an ultraviolet lamp to cure the resin composition, so that a machinable liner was formed in the inner circumferential surface of the sleeve bearing. Next, this machinable liner was subjected to the cutting and the grinding to have a liner thickness of 0.25 mm, and the sleeve was finished to the inner diameter of 25.4 mm.

<Evaluation of Workability During Manufacture of the Self-Lubricating Liner>

In such a case that the resin composition is applied on the inner circumferential surface of a sleeve bearing by using a dispenser and that the viscosity of the resin composition is low, liquid dropping (dripping) may occur after the application of the resin composition, which makes it difficult to apply the resin composition in uniform thickness. On the other hand, in such a case that the viscosity of the resin composition is too high, the resin composition cannot be discharged from the dispenser, which makes it difficult to form the liner. In all of Examples 1-15 and Comparative Examples 7-14, the resin compositions could be discharged from the dispenser without causing the liquid dropping. On the other hand, the liquid dropping occured in Comparative Examples 1-6, and the resin compositions could not be discharged from the dispenser in Comparative Examples 15-18. In particular, the resin compositions of Comparative Examples 17 and 18 were like a hard grease (wax), rather than a liquid.

In a case that the total amount of the first and the second PTFEs is low, or in a case that the ratio of the second PTFE with respect to the total amount of the first and second PTFEs is low, the viscosity of the resin composition becomes low. As indicated in TABLE 4 and TABLE 5, in all of Examples 1-15 and Comparative Examples 9-14 in which the total amount of the first and the second PTFEs was in the range of 30% by weight to 50% by weight, it is presumed that the liquid dropping did not occur because the viscosity of the resin composition was adjusted to an appropriate value. On the other hand, in Comparative Examples 1-6 in which the total amount of the first and the second PTFEs was low, namely, in the range of 10% by weight to 20% by weight, it is presumed that the liquid dropping occured because the viscosity of the resin composition was low. Further, regarding Comparative Examples 7 and 8, although the total amount of the first and the second PTFEs was as low as 20% by weight, it is presumed that the liquid dropping did not occur because the ratio of the second PTFE with respect to the total amount of the first and second PTFEs was high, namely in the range of 75% by weight to 100% by weight. As a result, the viscosity of the resin composition became high, and thus liquid dropping did not occur in Comparative Examples 7 and 8.

As indicated in TABLE 5, regarding Comparative Examples 15 and 16, it is presumed that the resin composition could not be discharged from the dispenser because the ratio of the second PTFE with respect to the total amount of the first and second PTFEs was high, namely in the range of 80% by weight to 100% by weight, and thus the viscosity of the resin composition became high. On the other hand, in Comparative Examples 8, 10 and 12, it is presumed that the resin composition could be discharged from the dispenser because in each of Comparative Examples 8, 10 and 12, although the ratio of the second PTFE with respect to the total amount of the first and second PTFEs was 100% by weight, the total amount of the first and the second PTFEs was in the range of 20% by weight to 40% by weight which was lower than those of Comparative Examples 15 and 16. As a result, the viscosity of the resin composition became low in Comparative Examples 8, 10 and 12.

In addition, the viscosity of the resin composition tends to be higher when PTFE having a smaller particle size is used, and tends to be lower when PTFE having a larger particle size is used. As indicated in TABLE 2, each of Comparative Examples 17 and 18 used PTFE G163 with an average particle size of 25 μm instead of the first PTFE with a larger average particle size in the range of 75 μm to 180 μm. It is presumed that this combination caused the viscosity of the resin composition to become high resulting in a hard grease-like (wax-like) composition. This result showed that a combined use of PTFE G163 having an average particle size of 25 μm and the second PTFE having a smaller average particle size in the range of 1 μm to 15 μm cannot avoid the excessive increase in viscosity of the resin composition. That is, in order to avoid an excessive increase in viscosity and provide a resin composition in liquid state with good workability during the application, it was found that it is necessary to have an adequate difference between the average particle sizes of the first PTFE and second PTFE when two kinds of PTFE with different sizes are combined. Specifically, it is preferable to use PTFE having an average particle size in the range of 75 μm to 180 μm as the first PTFE with larger particle size and PTFE having an average particle size in the range of 1 μm to 15 μm as the second PTFE with smaller particle size.

The result of evaluation regarding the workability during the manufacture of the liner are indicated in TABLE 4 and TABLE 5. In TABLE 4 and TABLE 5, a sign "+" means that the resin composition could be discharged from the dispenser and any liquid dropping was not observed, and a sign "−" indicates that the resin composition could not be discharged from the dispenser or the liquid dropping was observed.

The machinable liners could not be manufactured in Comparative Examples 15 to 18. Thus, twenty nine kinds of machinable liners made respectively from each of the resin compositions prepared in Examples 1 to 15 and Comparative Examples 1 to 14, except Comparative Examples 15 to 18, were subjected to the evaluation of performance by conducting the tests as follows.

<Performance Evaluation of Machinable Liner>

1. Radial Static Limit Load (Static Load Test)

TABLE 3 shows AS81934 standard requirements in this test. As indicated in the left column of TABLE 3, in the AS81934 standard, the radial static limit load is defined based on the material (aluminum alloy and stainless steel) and the inner diameter size of the sleeve bearing. According to the material and the size of the sleeve bearing used in Examples 1 to 15 and Comparative Examples 1 to 18, the sleeve bearing corresponds to model No. M81934/1-16C016 described in TABLE 3, and thus the maximum test load was determined to be 140 kN (31,400 lb).

TABLE 3

| Model No. | Radial static limit load (lb) | Oscillation load (lb) |
|---|---|---|
| M81934/1-08A012 | 6,900 | 6,300 |
| M81934/1-08C012 | 10,800 | 6,300 |
| M81934/1-16A016 | 20,000 | 16,500 |
| M81934/1-16C016 | 31,400 | 16,500 |
| M81934/1-24A016 | 30,000 | 22,500 |
| M81934/1-24C016 | 47,100 | 22,500 |

Figure 2:
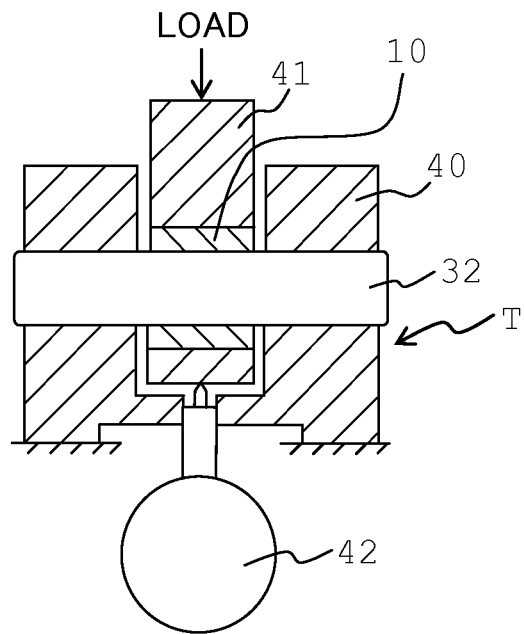
FIG. 2 shows a cross-sectional structure of a test jig in which the sleeve bearing manufactured in Examples is set.

As shown in FIG. 2, the sleeve bearing 10 is set on a test jig T first. The test jig T includes a base portion 40 having a H-shaped cross section which supports a shaft member 32, a weight 41 which applies the load in the radial direction of the sleeve bearing 10 into which the shaft member 32 is inserted, and a dial gauge 42 which is provided below the base portion 40. The shaft member 32 made of carbon steel is fitted to the inner circumferential surface of the sleeve bearing 10 to apply a load in the radial direction. The load is gradually increased up to a radial static limit load value 140 kN (31,400 lb). After reaching the radial static limit load value, the load is gradually removed. The displacement is measured by the dial gauge 42 during the test, and the permanent deformation when the load is returned to zero is read from the load-displacement curve. According to AS81934 standard requirement, this permanent deformation (maximum permissible permanent deformation after applying the radial static limit load) should be 0.051 mm (0.002 in) or less. Further, in all of the self-lubricating liners obtained from the resin compositions prepared in Examples 1 to 15 and Comparative Examples 1 to 14, the permanent deformation under the load of 140 kN was 0.25 mm or less. Further, the permanent deformation after loading was 0.051 mm or less in all of the self-lubricating liners obtained in Examples 1 to 15 and Comparative Examples 1 to 14. The results of the evaluation of the static load test are indicated in TABLE 4 and TABLE 5. In TABLE 4 and TABLE 5, a sign "+" means that the permanent deformation was 0.051 mm or less.

TABLE 4

|  | Total amount of first and second (meth)acrylate compounds (% by weight) | Amount of first (meth)acrylate compound (% by weight) | Total amount of first and second PTFEs (% by weight) | Ratio of second PTFE in total PTFEs (% by weight) |
|---|---|---|---|---|
| Example 1 | 57.7 | 33.6 | 30 | 50 |
| Example 2 | 48.3 | 28.1 | 40 | 25 |
| Example 3 | 48.3 | 28.1 | 40 | 50 |
| Example 4 | 48.3 | 28.1 | 40 | 75 |
| Example 5 | 38.8 | 22.6 | 50 | 20 |
| Example 6 | 38.8 | 22.6 | 50 | 40 |
| Example 7 | 38.8 | 22.6 | 50 | 60 |
| Example 8 | 48.3 | 28.1 | 40 | 50 |
| Example 9 | 48.3 | 28.1 | 40 | 50 |
| Example 10 | 48.3 | 28.1 | 40 | 50 |
| Example 11 | 48.3 | 28.1 | 40 | 50 |
| Example 12 | 40.2 | 16.0 | 50 | 60 |
| Example 13 | 61.4 | 33.6 | 30 | 50 |
| Example 14 | 57.7 | 33.6 | 30 | 50 |
| Example 15 | 57.7 | 33.6 | 30 | 50 |

|  | Evaluation result of workability | Static load test | Oscillation test wear amount (mm) | Evaluation result | Dynamic friction coefficient Initial torque (N·m) | Evaluation result |
|---|---|---|---|---|---|---|
| Example 1 | + | + | 0.068 | + | 79 | + |
| Example 2 | + | + | 0.004 | + | 80 | + |
| Example 3 | + | + | 0.003 | + | 79 | + |
| Example 4 | + | + | 0.088 | + | 78.4 | + |
| Example 5 | + | + | 0.002 | + | 79 | + |
| Example 6 | + | + | 0.01 | + | 76.6 | + |
| Example 7 | + | + | 0.083 | + | 71 | + |
| Example 8 | + | + | 0.021 | + | 76.2 | + |
| Example 9 | + | + | 0.003 | + | 79.4 | + |
| Example 10 | + | + | 0.014 | + | 77.5 | + |
| Example 11 | + | + | 0.003 | + | 79.4 | + |
| Example 12 | + | + | 0.085 | + | 72 | + |
| Example 13 | + | + | 0.036 | + | 78 | + |
| Example 14 | + | + | 0.025 | + | 79.4 | + |
| Example 15 | + | + | 0.034 | + | 80 | + |

TABLE 5

|  | Total amount of first and second (meth)acrylate compounds (% by weight) | Amount of first (meth)acrylate compound (% by weight) | Total amount of first and second PTFEs (% by weight) | Ratio of second PTFE in total PTFEs (% by weight) |
|---|---|---|---|---|
| Comparative Ex. 1 | 76.7 | 44.6 | 10 | 0 |
| Comparative Ex. 2 | 76.7 | 44.6 | 10 | 50 |
| Comparative Ex. 3 | 76.7 | 44.6 | 10 | 100 |
| Comparative Ex. 4 | 67.2 | 39.1 | 20 | 0 |
| Comparative Ex. 5 | 67.2 | 39.1 | 20 | 25 |
| Comparative Ex. 6 | 67.2 | 39.1 | 20 | 50 |
| Comparative Ex. 7 | 67.2 | 39.1 | 20 | 75 |
| Comparative Ex. 8 | 67.2 | 39.1 | 20 | 100 |
| Comparative Ex. 9 | 57.7 | 33.6 | 30 | 0 |

TABLE 5-continued

| | | | | |
|---|---|---|---|---|
| Comparative Ex. 10 | 57.7 | 33.6 | 30 | 100 |
| Comparative Ex. 11 | 48.3 | 28.1 | 40 | 0 |
| Comparative Ex. 12 | 48.3 | 28.1 | 40 | 100 |
| Comparative Ex. 13 | 38.8 | 22.6 | 50 | 0 |
| Comparative Ex. 14 | 48.3 | 28.1 | (40) | (50) |
| Comparative Ex. 15 | 38.8 | 22.6 | 50 | 80 |
| Comparative Ex. 16 | 38.8 | 22.6 | 50 | 100 |
| Comparative Ex. 17 | 48.2 | 28.1 | (40) | (50) |
| Comparative Ex. 18 | 48.2 | 28.1 | (40) | (75) |

| | Evaluation result of workability | Static load test | Oscillation test wear amount (mm) | Oscillation test Evalution result | Dynamic friction coefficient Initial torque (N · m) | Dynamic friction coefficient Evaluation result |
|---|---|---|---|---|---|---|
| Comparative Ex. 1 | − | + | 0.091 | + | 94.4 | − |
| Comparative Ex. 2 | − | + | 0.132 | − | 88.6 | − |
| Comparative Ex. 3 | − | + | 0.198 | − | 91.2 | − |
| Comparative Ex. 4 | − | + | 0.06 | + | 91 | − |
| Comparative Ex. 5 | − | + | 0.104 | + | 87.2 | − |
| Comparative Ex. 6 | − | + | 0.118 | − | 84.4 | − |
| Comparative Ex. 7 | + | + | 0.149 | − | 83.4 | − |
| Comparative Ex. 8 | + | + | 0.165 | − | 86.2 | − |
| Comparative Ex. 9 | + | + | 0.002 | + | 88.4 | − |
| Comparative Ex. 10 | + | + | 0.15 | − | 86.2 | − |
| Comparative Ex. 11 | + | + | 0.003 | + | 88.2 | − |
| Comparative Ex. 12 | + | + | 0.134 | − | 86.2 | − |
| Comparative Ex. 13 | + | + | 0.002 | + | 84 | − |
| Comparative Ex. 14 | + | + | 0.135 | − | 76.7 | + |
| Comparative Ex. 15 | − | N/A | N/A | N/A | N/A | N/A |
| Comparative Ex. 16 | − | N/A | N/A | N/A | N/A | N/A |
| Comparative Ex. 17 | − | N/A | N/A | N/A | N/A | N/A |
| Comparative Ex. 18 | − | N/A | N/A | N/A | N/A | N/A |

2. Oscillation Test Under Radial Load

An oscillation test was performed in a similar condition as the AS81934 standard, except that the radial load was set to be 55.1 kN. The oscillation test was performed at normal temperature, and the wear resistance of the self-lubricating liner was considered sufficient in a case that the wear amount after 25,000 cycles was 0.114 mm (0.0045 in) or less, similarly to the AS81934 standard.

The sleeve bearing 10 was set on the test jig T as shown in FIG. 2, and the load of 55.1 kN (16,500 lb) was applied in the radial direction and maintained statically for 15 minutes. After 15 minutes, the amount of displacement in the dial gauge 42 was set to zero and the oscillation of the shaft 32 was started. The shaft member 32 was oscillated within an angular range of ±25 degrees. The movement of the shaft member 32 going from the angle position 0 degrees to +25 degrees and coming back to 0 degrees, and then going to −25 degrees and coming back again to 0 degrees was counted as 1 cycle. An oscillation rate should be set to 10 cycles per minute (10 CPM) or more. In the performed test, the oscillation rate was set to 20 cycles per minute. During this oscillation test, the wear amount was read from the dial gauge 42 and recorded. The wear amount after 25,000 cycles in the oscillation test at normal temperature was 0.114 mm or less in all of Examples 1-15 and in Comparative Examples 1, 4, 5, 9, 11 and 13. However, the wear amount in Comparative Examples 2, 3, 6-8, 10, 12 and 14 exceeded 0.114 mm and did not satisfy the standard. The results of the wear amount (mm) and the oscillation test are indicated in TABLE 4 and TABLE 5. In the result of evaluation of the oscillation test, sign "+" indicates the wear amount of 0.114 mm or less, and sign "−" indicates the wear amount exceeding 0.114 mm.

3. Evaluation of Dynamic Friction Coefficient

The dynamic friction coefficient was evaluated on the basis of the initial torque in oscillation test under radial load. The oscillation test was performed in a similar condition as the above AS81934 standard, except that a torque detector was set on the test jig T as shown in FIG. 2, and that the radial load was set to be 60.4 kN corresponding to 200 MPa. The initial torque was measured after 100 cycles in the oscillation test. In a case that the initial torque is low, it is possible to consider that the dynamic friction coefficient is also low since the dynamic friction coefficient is proportional to the initial torque. In this evaluation, in a case that the initial torque was 80 Nm or less, the self-lubricating liner was considered to have satisfactory friction coefficient property.

The initial torque after 100 cycles in the oscillation test was 80 N·m or less in all of Examples 1 to 15 and in Comparative Example 14. On the other hand, the initial torque in each of Comparative Examples 1 to 13 exceeded 80 N·m. The initial torque (N·m) and the evaluation result of dynamic friction coefficient in each of Examples 1 to 15 and Comparative Examples 1 to 14 are indicated in TABLE 4 and TABLE 5. In the evaluation result of dynamic friction, sign "+" indicates the initial torque of 80 N·m or less, and sign "−" indicates the initial torque exceeding 80 N·m.

4. Overall Evaluation

As indicated in TABLE 4 and TABLE 5, the self-lubricating liners in all of Examples 1 to 15 were evaluated as "+" in all of the above evaluation results of the static load test, the oscillation test and dynamic friction coefficient. Further, workability during the manufacture of the self-lubricating liner in all of Examples 1 to 15 was also good. In Examples 1 to 15, the self-lubricating liners satisfying the three characteristics at the same time, that are the high load capacity, wear resistance and low friction coefficient, could be produced. This result was obtained presumably because, in each of Examples 1 to 15, the total amount of the first and the second PTFEs was in the range of 30% by weight to 50% by weight with respect to the entire amount of the ultraviolet curable resin composition, and also because the content ratio of the second PTFE was in the range of 20% by weight to 75% by weight with respect to the total amount of the first and second PTFEs.

On the other hand, the self-lubricating liners in Comparative Examples 1-14 were evaluated as "−" in at least one of the above evaluation results of the static load test, the oscillation test and dynamic friction coefficient. Further, the liquid dripping occured during the manufacture of the liner in each of Comparative Examples 1 to 6, and the liners could not be manufactured in Comparative Examples 15 to 18. The reason is presumably because, in Comparative Examples 1 to 18, the total amount of the first and the second PTFEs was out of the range of 30% by weight to 50% by weight with respect to the entire amount of the ultraviolet curable resin composition, or because the content ratio of the second PTFE was out of the range of 20% by weight to 75% by weight with respect to the total amount of the first and second PTFEs. For example, in Comparative Examples 1, 4, 5, 9, 11 and 13 in each of which the content ratio of the second PTFE with respect to the total amount of the first and second PTFEs was relatively low, namely in the range of 0% by weight to 25% by weight, the evaluation results of the oscillation test were "+", and the machinable liners of Comparative Examples 1, 4, 5, 9, 11 and 13 had sufficient wear resistance. However, in Comparative Examples 1, 4, 5, 9, 11 and 13, the evaluation results of dynamic friction coefficient were "−", and thus the machinable liners did not have any sufficient lubricating property. Further, in Comparative Example 14 using PTFE M-12 having small particle size of 50 μm, instead of using the first PTFE having a larger particle size, the evaluation result of dynamic friction coefficient was "+", and thus the machinable liner had sufficient lubricating property. However, in Comparative Example 14, the evaluation result of the oscillation test was "−", and thus the machinable liner did not demonstrate sufficient wear resistance.

In the above Example, the tests were carried out after performing the cutting and grinding of the machinable liner to adjust the thickness of each machinable liner to 0.25 μm. In addition to this, the resin compositions prepared in Examples 1 to 15 and Comparative Examples 1 to 14 were respectively used to manufacture machinable liners having thicknesses of 0.38 mm and 0.51 mm. Then, the same tests as described above were carried out for the sleeve bearings having the liners of the different thicknesses. As a result, it has been found out that similar evaluation results are obtained.

In the above examples, the resin composition related to the present invention was applied to the sleeve bearing with the shape as shown in FIG. 1. However, the application of the present invention is not limited to this shape, and it is possible to apply the resin composition related to the present invention to sliding members having a variety of shapes and structures.

<Spherical Bearing>

Figure 3:
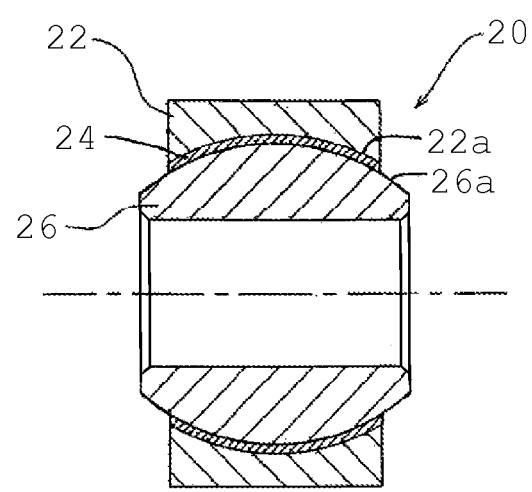
FIG. 3 is a cross-sectional view of the structure of a spherical bearing with a self-lubricating liner made from a resin composition according to an embodiment related to the present invention.

As shown in FIG. 3, a spherical bearing 20 includes an outer race (outer ring) 22 having a concave spherical inner circumferential surface 22a, an inner race (inner ring) 26 having a convex spherical outer circumferential surface 26a, and a machinable liner 24 formed between the inner circumferential surface 22a and the outer circumferential surface 26a. The thickness of the liner may be, for example, about 0.25 mm.

Figure 4A:
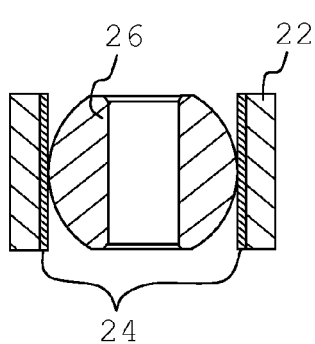
FIGS. 4A to 4C are views explaining a manufacturing process of the spherical bearing with the self-lubricating liner made from the resin composition according to an embodiment related to the present invention.
Figure 4B:
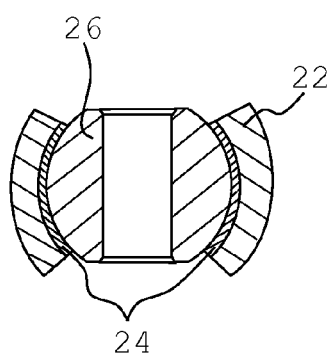
Figure 4C:
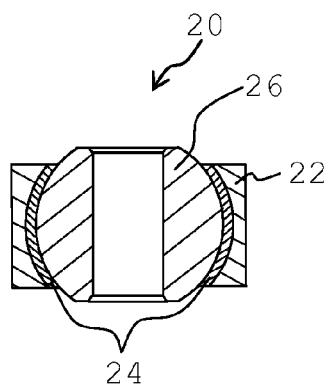

The spherical bearing 20 can be manufactured by a process using swage process, for example, as shown in FIG. 4A to FIG. 4C. At first, a resin composition 24 prepared in Example 2 was applied on the inner circumferential surface 22a of the outer race (outer ring) 22, and the resin composition was primarily cured by being irradiated with ultraviolet rays. Accordingly, the machinable liner (24) was formed. At this stage, the resin composition 24 is not completely cured. Then, the inner race (inner ring) 26 is inserted into the outer race 22 (FIG. 4A). Next, in the swage process, the outer race 22 is plastically deformed by a press so as to follow the outer circumferential surface of the inner race 26 (FIG. 4B). Next, the machinable liner 24 is cured completely by the secondarily curing of the machinable liner 24 by heat. Subsequently, the outside of the outer race 22 is finished by cutting process to complete the spherical bearing 20 (FIG. 4C).

Since the ultraviolet curable resin is used in the resin composition related to the present invention, the resin composition can be cured in a semi-cured state (primary curing), instead of being cured completely. Therefore, the resin composition in the semi-cured state after the primary curing can easily follow the deformation of the outer race in the swage process. Accordingly, it is possible to form a liner having a uniform thickness on the spherical bearing. The resin composition in the semi-cured state can be obtained by adjusting and shortening the irradiation time of ultraviolet rays to stop the polymerization reaction early. Since the liner in the semi-cured state is sandwiched between the inner race and the outer race after the swage process, the liner cannot be irradiated with ultraviolet rays after the swage process. Therefore, the secondary curing is performed by heating to completely cure the liner including the inside thereof. In this respect, it is preferred that a thermosetting agent be added in the resin composition. However, in a case that the structure of the sliding surface or the like is so that the liner can be irradiated with ultraviolet rays, the ultraviolet irradiation may be used instead of the heating. If a thermoplastic resin or a thermosetting resin is used as the resin composition, the resin does not follow the deformation of the outer race properly unless the resin is in an uncured state. In such a condition, the swage process becomes difficult to be performed.

<Rod End Spherical Bearing>

Figure 5A:
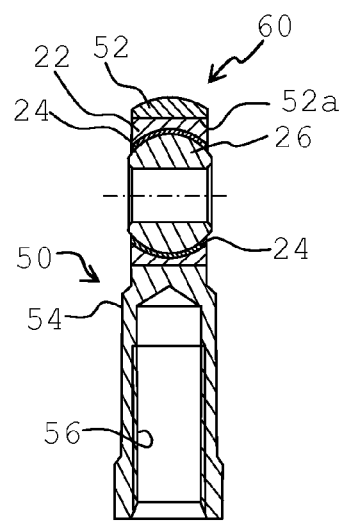
FIG. 5A is a longitudinal sectional view of a rod end spherical bearing into which the spherical bearing according to an embodiment of the present invention is incorporated and FIG. 5B is a lateral sectional view of the same.
Figure 5B:
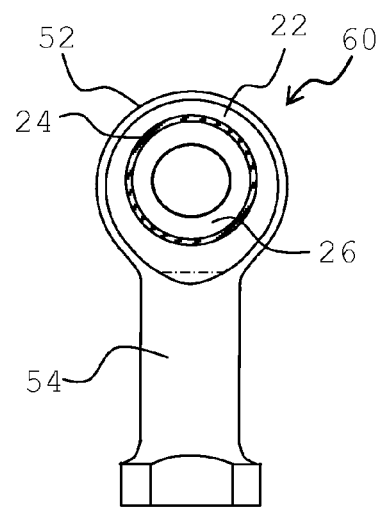

FIGS. 5A and 5B each show an exemplary rod end spherical bearing 60 in which the spherical bearing 20 is incorporated into a rod end body 50. The rod end body 50 is composed of a head portion 52 having a through hole 52a into which the spherical bearing 20 is incorporated, and a shaft portion 54 provided with a female or male thread 56. The shaft portion 54 is a body in a substantially cylindrical shape extending from the head portion 52 in a radial direction of the through hole 52a. After inserting the spherical bearing 20 in the through hole 52a, a V-shaped groove (not shown) formed at the edge of the through hole 52a is swaged, so that the spherical bearing 20 is fixed to the rod end body 50.

<Reamer Bolt>

Figure 6:
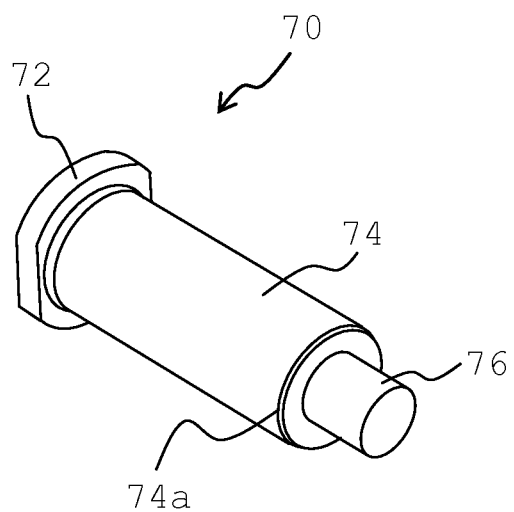
FIG. 6 is a view of the outer appearance of a reamer bolt with a self-lubricating liner which is formed on a shaft surface of the reamer bolt and is made from the resin composition according to an embodiment of the present invention.

A reamer bolt 70 as shown in FIG. 6 includes a main body portion composed of a head portion 72, a shaft portion 74 having a large diameter and a male thread portion 76 having a small diameter, and a machinable liner 74a provided on the outer circumference of the shaft portion 74. The machinable liner 74a is formed by uniformly applying and curing a resin composition prepared in any of Examples in a similar manner as that described in Examples. The main body portion of the reamer bolt 70 is formed, for example, by SUS630. The thickness of the machinable liner 74a may be in the range of about 0.25 mm to 0.5 mm.

The reamer bolt 70 is used in important connection portions transmitting a high torque, such as a propeller shaft of vessels or ships, a flight control surface of aircraft, and a connecting rod of automobile engines. The reamer bolt 70 used in such important connection portions is required to be fitted to a bolt hole with high precision without any play. Therefore, the shaft portion 74 of the reamer bolt 70 is finished with high precision, but even so, it is advantageous that the size adjustment of the bolt can be performed at the time of assembly. Since the reamer bolt related to the present invention includes the machinable liner 74a, the user is capable of easily adjusting the size of outer diameter of the shaft portion even after curing of the resin. Further, since the reamer bolt related to the present invention includes the self-lubricating machinable liner 74a on the shaft portion 74, even when the bolt is inserted or removed at the time of assembly or disassembly, galling and the like do not occur resulting in a reamer bolt 70 with a long service life.

Although the present invention has been explained by Examples, the present invention is not limited to Examples and can be substantiated in various embodiments and aspects within the scope of the claims. For example, in the above embodiments, the self-lubricating liner is formed on an inner circumferential surface of an outer race of a spherical bearing and a rod end spherical bearing. The self-lubricating liner, however, may be formed on an outer circumferential surface of an inner race of them. Further, although the explanation has been made by citing the spherical bearing, the rod end spherical bearing and the reamer bolt as examples of the sliding member, the present invention is not limited to these and can be applied to any sliding member provided that the sliding member includes the self-lubricating liner. Especially, although the explanation has been made in the above embodiment by citing the sliding member used for the rotary motion of the member or the part, the sliding member related to the present invention includes not only that for the rotary motion but also a sliding member used for sliding motion in any direction such as translational motion (linear motion), oscillating motion, and any combination thereof.

As described above, the resin composition related to the present invention can be used as the self-lubricating liner by being applied on the sliding surface of the sliding member and being cured by ultraviolet irradiation. A process with high temperature and high pressure is not required to cure the resin composition. Further, since the adhesion of the cured resin composition to the applied surface (base surface) is extremely strong, no process is required to roughen the surface. Therefore, a relatively large amount of PTFE can be contained while ensuring the safety of work, and also the equipment cost can be reduced. The self-lubricating liner manufactured as described above can be formed in various sliding members including sliding bearings such as a sleeve bearing and a spherical bearing. By making the sliding member have the self-lubricating liner made from the resin composition related to the present invention, the surface of the liner can be subjected to the cutting, the grinding, and the like, which makes it possible to perform the fine-adjustment of inner diameter size of the bearing when the shaft is installed by an end-user. Therefore, the resin composition related to the present invention and the sliding member provided with the self-lubricating liner made from the resin composition related to the present invention are very useful in wide fields such as vessels, aircraft, automobiles, electronic products, and home electric appliances.

What is claimed is:

1. An ultraviolet curable resin composition for a self-lubricating liner, the composition comprising:
   a first (meth)acrylate compound having an isocyanuric acid ring represented by the following formula (1):

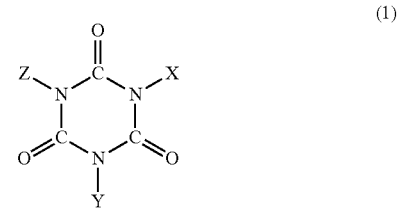

(wherein X is a group which contains an acryloyl group and is composed only of C, H, and O, and Y and Z are groups each composed only of C, H, and O);
   a second (meth)acrylate compound different from the first (meth)acrylate compound;
   a first polytetrafluoroethylene resin with an average particle size in the range of 75 μm to 180 μm; and
   a second polytetrafluoroethylene resin with an average particle size in the range of 1 μm to 15 μm,
   wherein a total amount of the first polytetrafluoroethylene resin and the second polytetrafluoroethylene resin is in the range of 30% by weight to 50% by weight with respect to an entire amount of the ultraviolet curable resin composition; and
   the second polytetrafluoroethylene resin is contained in an amount of 20% by weight to 75% by weight with respect to the total amount of the first and second polytetrafluoroethylene resins.

2. The ultraviolet curable resin composition according to claim 1, wherein the first (meth)acrylate compound is contained in an amount of 15% by weight to 35% by weight with respect to the entire amount of the ultraviolet curable resin composition; and
   a total amount of the first (meth)acrylate compound and the second (meth)acrylate compound is in the range of 35% by weight to 65% by weight with respect to the entire amount of the ultraviolet curable resin composition.

3. The ultraviolet curable resin composition according to claim 1, wherein a melting point of the first polytetrafluoroethylene resin is higher than a melting point of the second polytetrafluoroethylene resin.

4. The ultraviolet curable resin composition according to claim 1, wherein the first (meth)acrylate compound having the isocyanuric acid ring represented by the formula (1) is one of di-(2-acryloxyethyl)isocyanurate, tris-(2-acryloxyethyl)isocyanurate, and ε-caprolactone modified tris-(2-acryloxyethyl)isocyanurate, or a mixture of the di-(2-acryloxyethyl)isocyanurate and the tris-(2-acryloxyethyl) isocyanurate.

5. The ultraviolet curable resin composition according to claim 1, wherein the second (meth)acrylate compound includes at least one meth(acrylate) compound selected from the group consisting of: hydroxyethyl(meth)acrylate, hydroxypropyl (meth)acrylate and isobornyl (meth)acrylate; and the at least one meth(acrylate) compound is contained in an amount of 5% by weight to 20% by weight with respect to the entire amount of the ultraviolet curable resin composition.

6. The ultraviolet curable resin composition according to claim 1, wherein the second (meth)acrylate compound includes at least one meth(acrylate) compound selected from the group consisting of: pentaerythritol triacrylate, pentaerythritol tetraacrylate, dipentaerythritol penta(meth)acrylate, dipentaerythritol hexa(meth)acrylate, and dipentaerythritol polyacrylate; and
the at least one meth(acrylate) compound is contained in an amount of 8% by weight or less with respect to the entire amount of the ultraviolet curable resin composition.

7. The ultraviolet curable resin composition according to claim 1, wherein the second (meth)acrylate compound includes bisphenol A-type epoxy modified acrylate; and the bisphenol A-type epoxy modified acrylate is contained in an amount of 10% by weight or less with respect to the entire amount of the ultraviolet curable resin composition.

8. The ultraviolet curable resin composition according to claim 1, wherein the second (meth)acrylate compound includes at least one meth(acrylate) compound selected from the group consisting of: urethane acrylate, ethylene glycol di(meth)acrylate, propylene glycol di(meth)acrylate, butylene glycol di(meth)acrylate, hexanediol di(meth)acrylate, tetraethylene glycol di(meth)acrylate, triethylene glycol di(meth)acrylate, and tripropylene glycol di(meth)acrylate; and
the at least one meth(acrylate) compound is contained in an amount of 2% by weight or less with respect to the entire amount of the ultraviolet curable resin composition.

9. The ultraviolet curable resin composition according to claim 1, wherein the first (meth)acrylate compound is a mixture of di-(2-acryloxyethyl)isocyanurate and tris-(2-acryloxyethyl)isocyanurate; and
the second (meth)acrylate compound is a mixture of bisphenol A-type epoxy modified acrylate, dipentaerythritol hexa(meth)acrylate, isobornyl (meth)acrylate, hydroxyethyl (meth)acrylate, and ethylene glycol di(meth)acrylate.

10. The ultraviolet curable resin composition according to claim 1, further comprising a thermosetting agent.

11. A sliding member comprising a self-lubricating liner which is formed on a sliding surface of the sliding member and is made of the ultraviolet curable resin composition according to claim 1.

12. The sliding member according to claim 11, wherein the sliding member is a sliding bearing.

13. The sliding member according to claim 12, wherein the sliding bearing is a spherical bearing.

14. The sliding member according to claim 11, wherein the sliding member is a bolt comprising a head portion, a shaft portion, a thread portion, and the self-lubricating liner formed on an outer circumferential surface of the shaft portion.

15. A manufacturing method for producing a sliding member, comprising:
applying an ultraviolet curable resin composition on a sliding surface of the sliding member; and
curing the ultraviolet curable resin composition by irradiation with ultraviolet rays to form a self-lubricating liner,
wherein the ultraviolet curable resin composition comprises:
a first (meth)acrylate compound having an isocyanuric acid ring represented by the following formula (1):

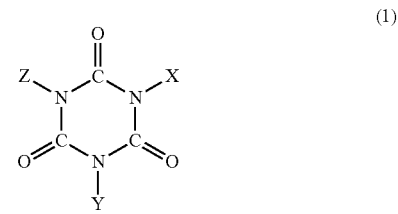

(wherein X is a group which contains an acryloyl group and is composed only of C, H, and O and Y and Z are groups each composed only of C, H, and O);
a second (meth)acrylate compound different from the first (meth)acrylate compound;
a first polytetrafluoroethylene resin with an average particle size in the range of 75 μm to 180 μm; and
a second polytetrafluoroethylene resin with an average particle size in the range of 1 μm to 15 μm,
wherein a total amount of the first polytetrafluoroethylene resin and the second polytetrafluoroethylene resin is in the range of 30% by weight to 50% by weight with respect to an entire amount of the ultraviolet curable resin composition; and
the second polytetrafluoroethylene resin is contained in an amount of 20% by weight to 75% by weight with respect to the total amount of the first and second polytetrafluoroethylene resins.

16. The manufacturing method for producing the sliding member according to claim 15, wherein the first (meth) acrylate compound is contained in an amount of 15% by weight to 35% by weight with respect to the entire amount of the ultraviolet curable resin composition; and
a total amount of the first (meth)acrylate compound and the second (meth)acrylate compound is in the range of 35% by weight to 65% by weight with respect to the entire amount of the ultraviolet curable resin composition.

17. The manufacturing method for producing the sliding member according to claim 15, further comprising performing cutting or grinding of the self-lubricating liner to have a desired size.

18. The manufacturing method for producing the sliding member according to claim 15,
wherein the ultraviolet curable resin composition contains a thermosetting agent;
the sliding member is a spherical bearing including an outer race member which has a concave first bearing surface and an inner race member which has a convex second bearing surface slidably movable on the first bearing surface; and
the self-lubricating liner is formed by:
applying the ultraviolet curable resin composition on the concave first bearing surface or the convex second bearing surface as a sliding surface;
curing the ultraviolet curable resin composition applied on the concave first bearing surface or the convex second bearing surface until a semi-cured state by irradiation with the ultraviolet rays;

inserting the inner race member into the outer race member after the ultraviolet curable resin composition is semi-cured;

pressing the outer race member to cause plastic deformation so as to make the outer race member follow the convex second bearing surface of the inner race member; and curing the ultraviolet curable resin composition completely by heat after the plastic deformation.

* * * * *